(12) United States Patent
Hayashi

(10) Patent No.: US 10,146,038 B2
(45) Date of Patent: Dec. 4, 2018

(54) DISK SCANNING APPARATUS AND MICROSCOPE APPARATUS

(71) Applicant: OLYMPUS CORPORATION, Shibuya-ku, Tokyo (JP)

(72) Inventor: Kazuhiro Hayashi, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 648 days.

(21) Appl. No.: 14/321,403

(22) Filed: Jul. 1, 2014

(65) Prior Publication Data
US 2015/0042779 A1    Feb. 12, 2015

(30) Foreign Application Priority Data

Aug. 12, 2013  (JP) .................................. 2013-167282

(51) Int. Cl.
*H04N 9/47* (2006.01)
*G02B 21/00* (2006.01)

(52) U.S. Cl.
CPC ..... *G02B 21/0076* (2013.01); *G02B 21/0044* (2013.01)

(58) Field of Classification Search
CPC .................................................. G02B 21/0068
See application file for complete search history.

(56) References Cited

U.S. PATENT DOCUMENTS

| 5,745,297 | A | * | 4/1998 | Kaneko | G02B 13/04 |
| | | | | | 359/651 |
| 6,160,662 | A | | 12/2000 | Uchida et al. | |
| 2004/0189983 | A1 | * | 9/2004 | Takahashi | G01B 11/26 |
| | | | | | 356/139.1 |
| 2007/0146872 | A1 | * | 6/2007 | Bocher | G02B 21/0088 |
| | | | | | 359/386 |

(Continued)

FOREIGN PATENT DOCUMENTS

| JP | 09265043 A | 10/1997 |
| JP | 11344675 A | 12/1999 |

(Continued)

OTHER PUBLICATIONS

Japanese Office Action (and English translation thereof) dated Jul. 18, 2017 issued in counterpart Japanese Application No. 2013-167282.

*Primary Examiner* — Frederick D Bailey
*Assistant Examiner* — Masum Billah
(74) *Attorney, Agent, or Firm* — Holtz, Holtz & Volek PC

(57) ABSTRACT

A disk scanning apparatus is used in combination with an imaging optical system and an imaging apparatus. The disk scanning apparatus includes a rotating disk and a relay optical system. In the rotating disk, a disk surface including a shielding part and a transmitting part is placed so as to be positioned on a focal plane of the imaging optical system. The relay optical system performs relaying of an optical image of a sample to the imaging apparatus. The relay optical system includes a front group having a positive (Continued)

power and a rear group having a positive power, in this order from the rotating disk side, and is configured so that a luminous flux between the front group and the rear group becomes an afocal luminous flux. The disk scanning apparatus further includes a structure configured to make the distance between the front group and the rear group variable.

9 Claims, 24 Drawing Sheets

(56) References Cited

U.S. PATENT DOCUMENTS

| | | | | |
|---|---|---|---|---|
| 2009/0135396 A1* | 5/2009 | Mizuno | ............... | G03F 7/70108 |
| | | | | 355/71 |
| 2012/0081535 A1* | 4/2012 | Hayashi | ............. | G02B 21/0032 |
| | | | | 348/79 |
| 2013/0088776 A1* | 4/2013 | Nakayama | ......... | G01N 21/6458 |
| | | | | 359/381 |

FOREIGN PATENT DOCUMENTS

| | | | |
|---|---|---|---|
| JP | 3178592 B2 | | 6/2001 |
| JP | 2004302441 A | | 10/2004 |
| JP | 2006154239 A | | 6/2006 |
| JP | 2008102156 A | * | 5/2008 |
| JP | 2010181688 A | | 8/2010 |
| JP | 2013054102 A | | 3/2013 |

* cited by examiner

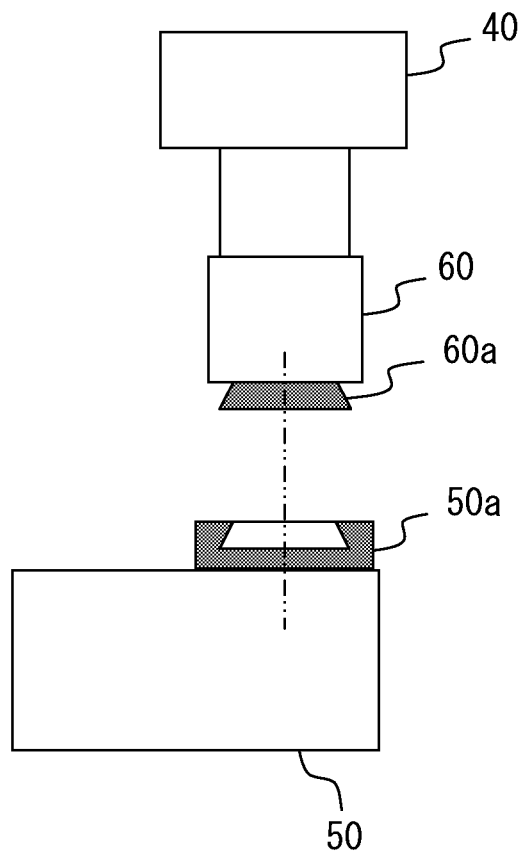
F I G. 3 A

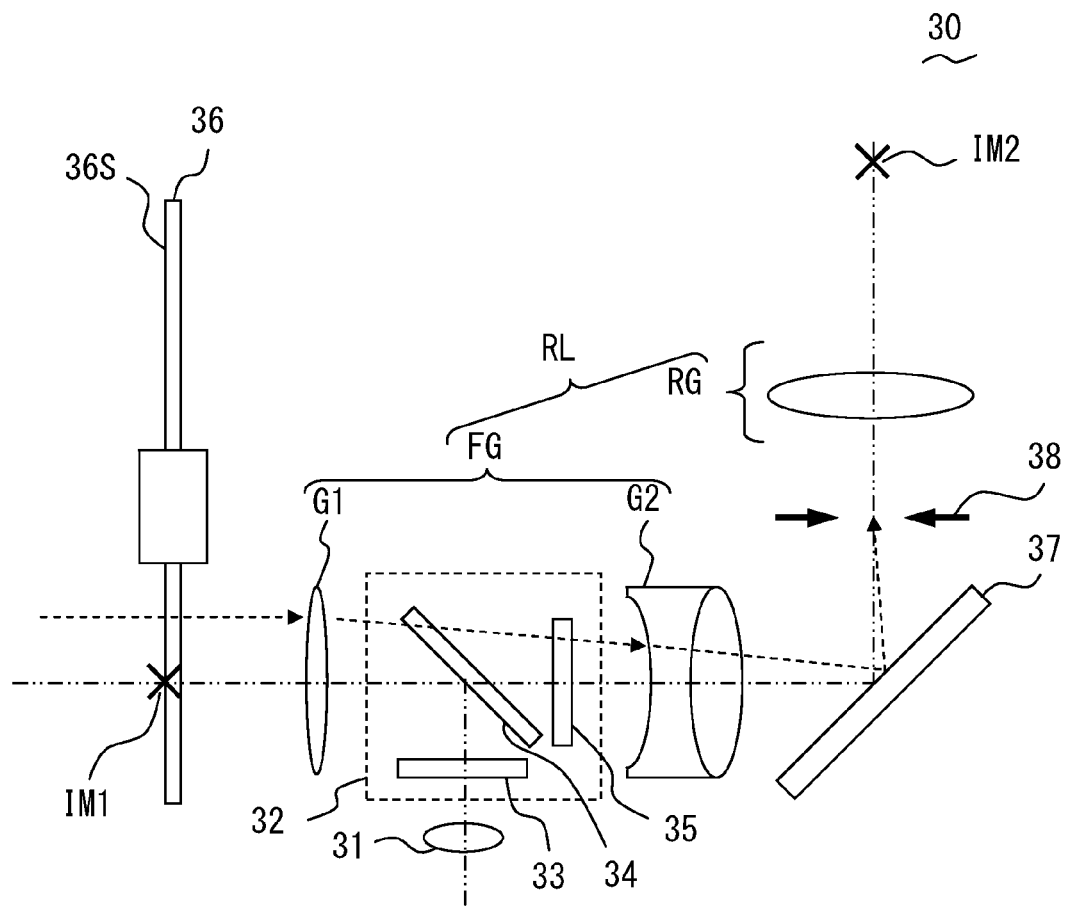
F I G. 4 A

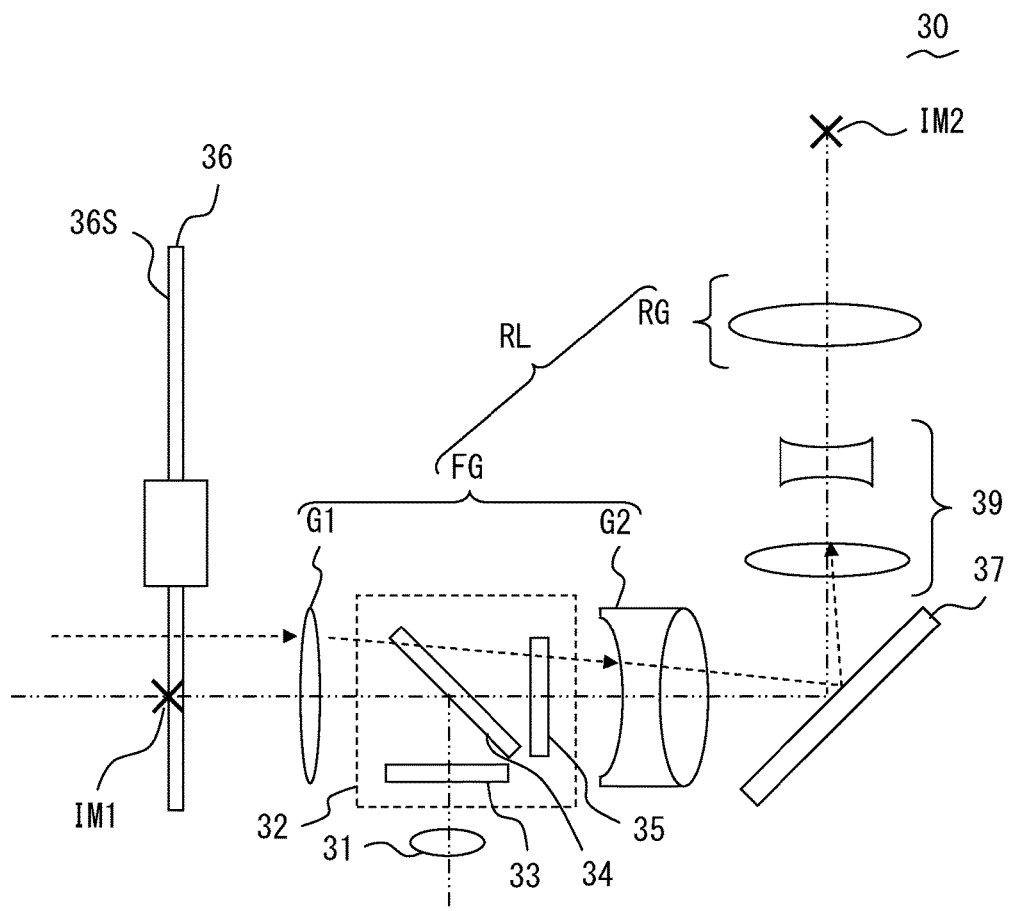
F I G. 4 B

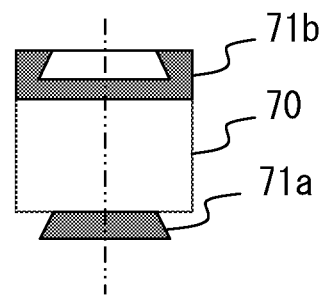
F I G. 5 A

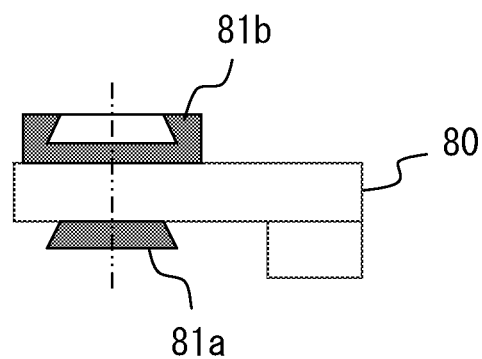
F I G. 6 A

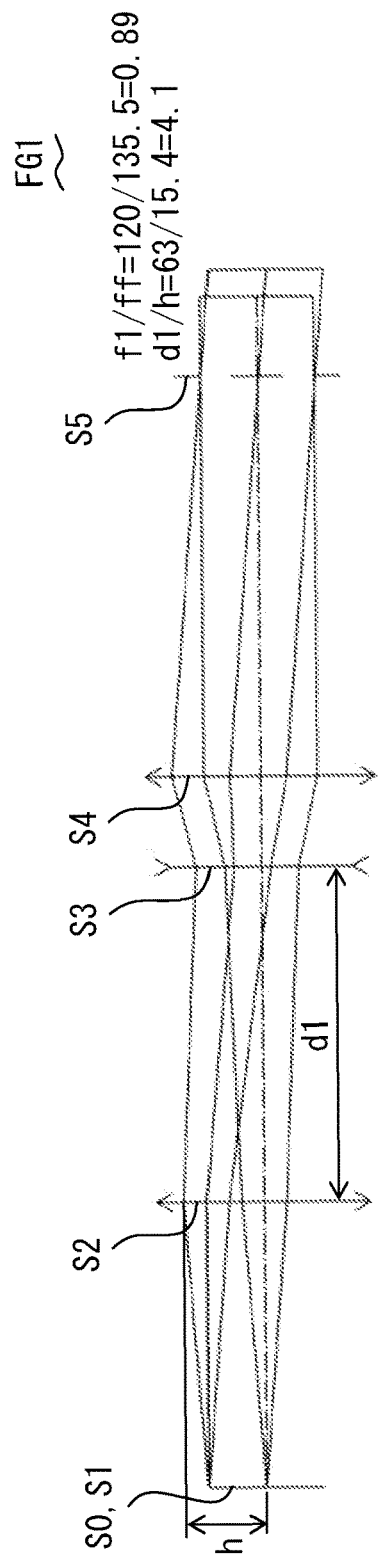
F I G. 8 A

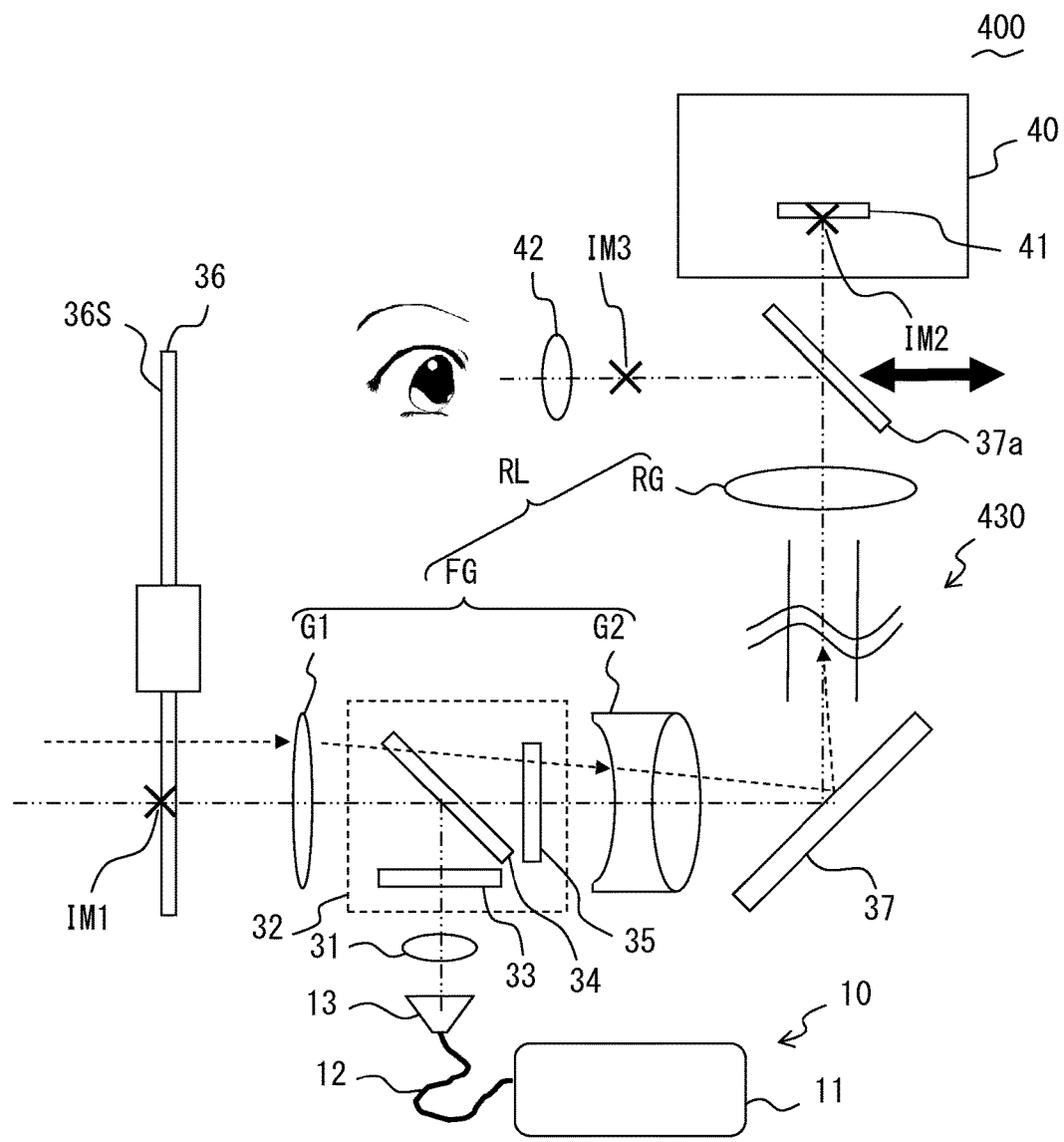
F I G. 14

DISK SCANNING APPARATUS AND MICROSCOPE APPARATUS

CROSS-REFERENCE TO RELATED APPLICATION

This application is based upon and claims the benefit of priority from prior Japanese Patent Application No. 2013-167282, filed Aug. 12, 2013, the entire contents of which are incorporated herein by this reference.

FIELD

The present invention relates to a disk scanning apparatus for irradiating a sample with an excitation light through a rotating disk that performs optical scanning and for detecting fluorescence emitted from a sample through the rotating disk, and a microscope apparatus equipped with the disk scanning apparatus.

BACKGROUND

Fluorescence observation methods in which a sample is observed by irradiating the sample with an excitation light and detecting fluorescence emitted from the sample have been known as methods for observing a biological sample. Among them, the confocal fluorescence observation method which is a type of fluorescence observation method has been known as a method by which a fluorescence image that has a higher contrast and resolution compared with those with a normal fluorescence observation method may be obtained.

In the confocal fluorescence observation, an image of a sample is obtained by scanning the sample using a scanning unit. A mirror-type scanning unit such as a galvanomirror and a disk-type scanning unit such as a Nipkow disk are popular scanning unit used for the confocal fluorescence observation.

Disk-type scanning unit is disclosed in Japanese Laid-open Patent Publication No. 2013-054102, for example. While this is not particularly mentioned in Japanese Laid-open Patent Publication No. 2013-054102, a disk-type scanning unit and a relay optical system that performs relaying of an optical image of a sample to an imaging apparatus may be provided as a single unit (hereinafter referred to as a disk scanning apparatus) to being incorporated into a microscope apparatus.

SUMMARY

An aspect of the present invention provides a disk scanning apparatus used in combination with an imaging optical system that collects fluorescence emitted from a sample and forms an optical image of the sample and with an imaging apparatus that captures an image of the sample, including a rotating disk including a shielding part that blocks off light and a transmitting part that transmits light on a disk surface, with the disk surface placed so as to be positioned on a focal plane of the imaging optical system in which the optical image of the sample is formed, and configured to rotate on an axis orthogonal to the disk surface; a relay optical system configured to perform relaying of the optical image of the sample formed on the disk surface to the imaging apparatus combined with the disk scanning apparatus, including a front group having a positive power and a rear group having a positive power, in this order from the rotating disk side, and configured so that a luminous flux between the front group and the rear group becomes an afocal luminous flux; and a structure configured to make a distance between the front group and the rear group variable.

BRIEF DESCRIPTION OF DRAWINGS

The present invention will be more apparent from the following detailed description when the accompanying drawings are referenced.

FIG. 3A is a diagram illustrating an example of a first housing and a second housing of a disk scanning apparatus according to Embodiment 1 of the present invention.

FIG. 4A is a diagram illustrating a disk scanning apparatus according to Embodiment 1 of the present invention in which an aperture stop is added in an optical path of an afocal luminous flux.

FIG. 4B is a diagram illustrating a disk scanning apparatus according to Embodiment 1 of the present invention in which an afocal variable power optical system is added in an optical path of an afocal luminous flux.

FIG. 5A is a diagram illustrating an example of a third housing of a disk scanning apparatus according to Embodiment 1 of the present invention.

FIG. 6A is a diagram illustrating an example of a third housing that is capable of accommodating a plurality of optical elements, in a disk scanning apparatus according to Embodiment 1 of the present invention.

FIG. 8A is a diagram illustrating an example of a configuration of a front group constituted by ideal lenses.

FIG. 14 is a conceptual diagram illustrating a configuration of a microscope apparatus according to Embodiment 4 of the present invention.

DESCRIPTION OF EMBODIMENTS

Various functions are desired for microscope apparatuses used for fluorescence observations, depending on their usage purposes. The same applies to disk scanning apparatuses incorporated into microscope apparatuses. Therefore, it is desirable that a disk scanning apparatus be configured so that various optical elements for realizing functions depending on its usage purpose may be added according to the need.

However, conventional disk scanning apparatuses are not versatile enough to realize functions depending on their purposes, due to space limitations for adding optical elements. On the other hand, if a larger than usual space is given for adding optical elements in order to provide a higher versatility, this causes an expansion of the size of the disc scanning apparatus.

Hereinafter, respective embodiments of the present invention are explained.

Embodiment 1

Figure 1:
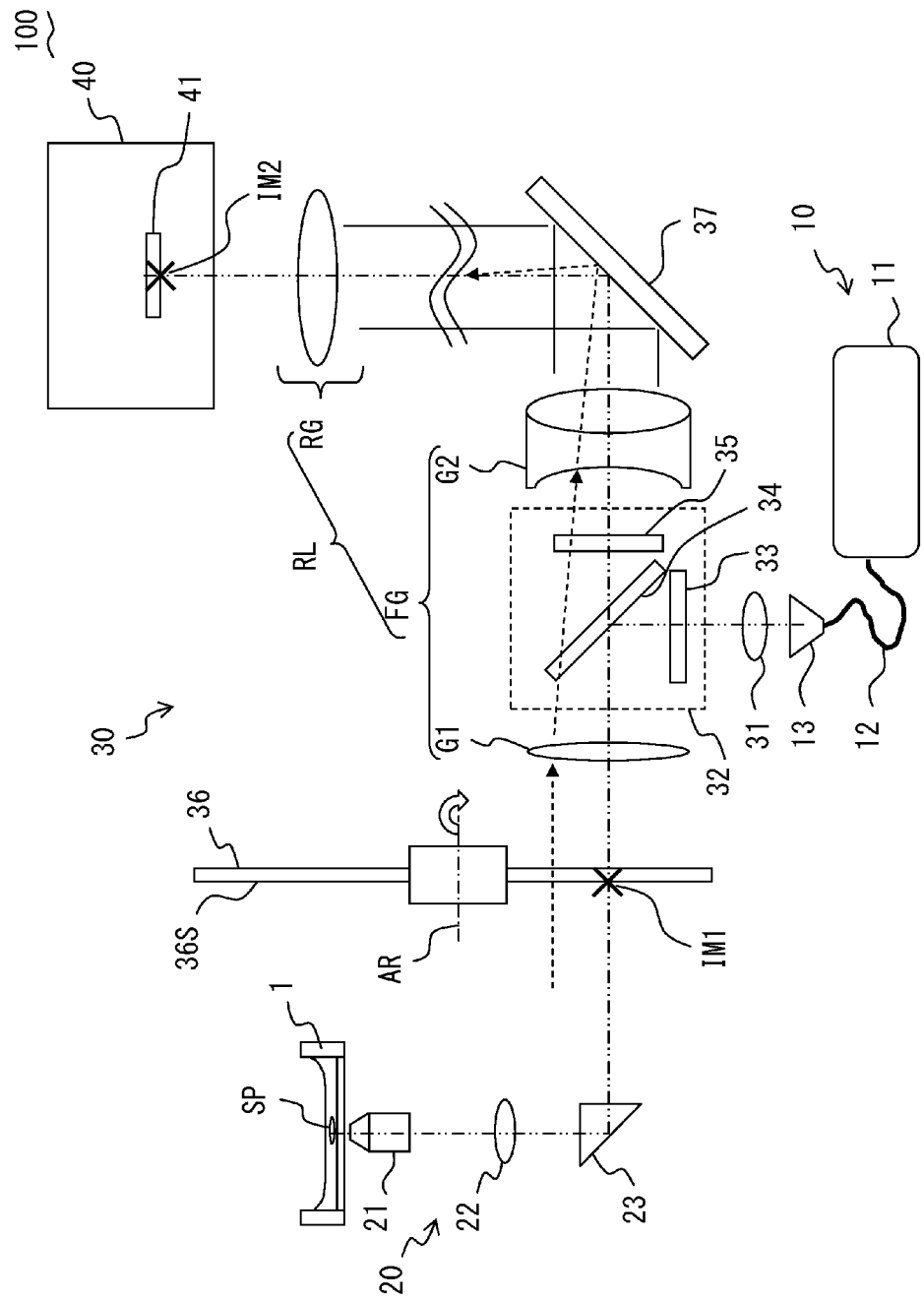
FIG. 1 is a conceptual diagram illustrating a configuration of a microscope apparatus according to Embodiment 1 of the present invention.

FIG. 1 is a conceptual diagram illustrating a configuration of a microscope apparatus 100 according to the present embodiment. The microscope apparatus 100 is a fluorescence microscope apparatus that detects fluorescence emitted from a sample SP held by a sample holding member 1 and obtains a fluorescence image of the sample SP. With the microscope apparatus 100, the observation method can be switched between the confocal fluorescence observation method and the normal fluorescence observation method by changing or inserting/detaching a rotation disk of a disk scanning apparatus 30.

As illustrated in FIG. 1, the microscope apparatus 100 includes a light source unit 10, an imaging optical system 20, a disk scanning apparatus 30, and a CCD (Charge Coupled Device) camera 40.

The light source unit 10 is a unit that supplies an excitation light for exciting the sample SP, and it includes alight source apparatus 11, an optical fiber 12 and a connecting unit 13 for connecting the light source unit 10 to the disk scanning apparatus 30. The light source apparatus 11 includes, for example, a light source that emits a white light, such as a mercury lamp or a xenon lamp.

The imaging optical system 20 is an optical system that collects fluorescence emitted from the sample SP and forms an optical image IM1 of the sample SP, and it includes an objective 21, a tube lens 22, and a right-angled prism 23. The objective 21 is held by a revolving nosepiece which is not illustrated in the drawings, and it is used while appropriately switched with another objective that has different optical specifications (for example, magnification) held by the revolving nosepiece.

The CCD camera 40 is an imaging apparatus that captures an image of the sample SP. The CCD camera 40 includes a CCD 41 as an imaging element.

The disk scanning apparatus 30 is an apparatus configured to be detachable from the microscope apparatus 100 and to be used in combination with the light source unit 10, imaging optical system 20, and the CCD camera 40. The disk scanning apparatus 30 includes a lens 31, a fluorescence mirror unit 32, a rotating disk 36, a mirror 37, and a relay optical system RL. The disk scanning apparatus 30 is placed so that a disk surface 36S of the rotating disk 36 is positioned on the focal plane of the imaging optical system 20 on which the optical image IM1 of the sample SP is formed.

The lens 31 is a lens that guides a white light emitted from the light source unit 10 to the fluorescence mirror unit 32. The fluorescence mirror unit 32 guides light that has an excitation wavelength (i.e., an excitation light) selectively to the sample SP, and it also guides fluorescence emitted from the sample SP to the CCD camera 40. The fluorescence mirror unit 32 is constituted by an excitation filter 33 that transmits an excitation light, a dichroic mirror 34 that is a light separating unit to reflect an excitation light and to transmit fluorescence, and a barrier filter 35 that shields an excitation light.

Figure 2A:
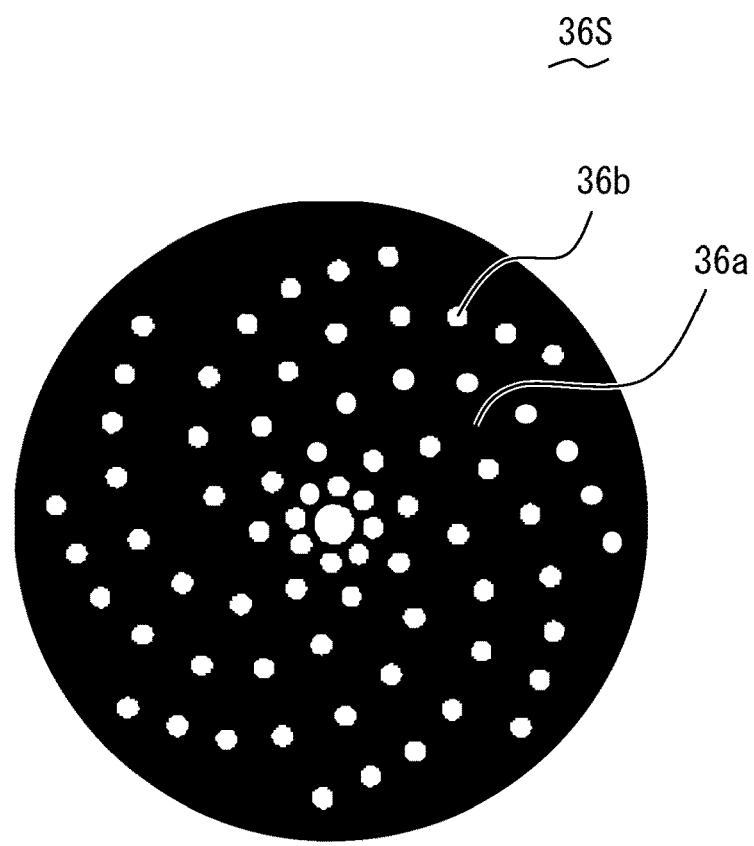
FIG. 2A is a diagram illustrating an example of a configuration of a rotating disk included in a disk scanning apparatus according to Embodiment 1 of the present invention.
Figure 2B:
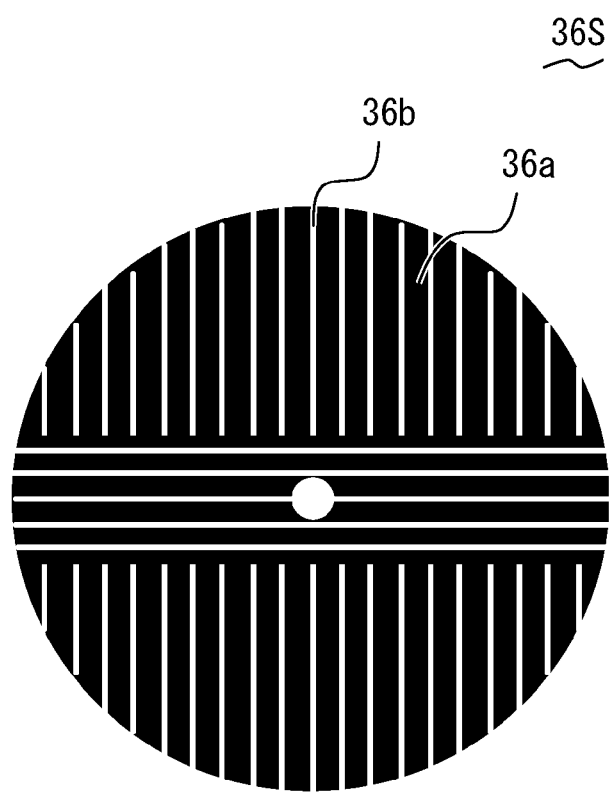
FIG. 2B is a diagram illustrating another example of a configuration of a rotating disk included in a disk scanning apparatus according to Embodiment 1 of the present invention.

The rotating disk 36 is configured so as to be rotated on a rotation axis AR orthogonal to the disk surface 36S by a driving unit (for example, a motor or the like) which is not illustrated in the drawings. As illustrated in FIG. 2A and FIG. 2B, the rotating disk 36 includes a shielding part 36a that blocks out light and a transmitting part 36b that transmits light.

The rotating disk 36 is, for example, a round glass substrate in which a light shielding film is selectively formed on the surface. In this case, the light shielding film formed on the surface of the glass substrate is the shielding part 36a, and the portion in which the glass substrate is exposed is the transmitting part 36b. Meanwhile, the rotating disk 36 is a disk used when a confocal fluorescence observation is performed. When a normal fluorescence observation is performed, a disk on which no shielding parts are formed is used instead of the rotating disk 36. This disk is for preventing changes in the image position caused by the exchange of disks, and the disk may be constituted by a round glass substrate that has the same thickness and the same refractive index as those of the rotating disk 36.

In addition, the rotating disk 36 may also be a Nipkow disk that includes the transmitting part 36b in a pinhole shape and the shielding part 36a that is the portion on which no pinholes are formed, on the disk surface 36S, as illustrated in FIG. 2A. Furthermore, the rotating disk 36 may have, for example, a slit for transmitting light formed on a round substrate in which a light shielding film is formed on the entire surface, as illustrated in FIG. 2B. In this case, the slit is the transmitting part 36b and the portion on which no slits are formed is the shielding part 36a. Then, the observation method is switched from the confocal fluorescence observation to the normal fluorescence observation by removing the rotating disk 36 from the optical path. Meanwhile, the disk patterns explained above (the patterns defined by the shielding part 36a and the transmitting part 36b) are given merely as examples, and the rotating disk 36 may have any disk pattern.

The mirror 37 is a deflecting mirror that deflects light so that the disk scanning apparatus 30 may be formed in a compact manner.

The relay optical system RL is an optical system that performs relaying of the optical image IM1 of the sample SP formed on the disk surface 36S to the CCD camera 40. The relay optical system RL is constituted by a front group FG that has a positive power and a rear group RG that has a positive power in this order from the rotating disk 36 side, and it is configured so that the luminous flux between the front group FG and the rear group RG is an afocal luminous flux. More specifically, it is configured so that the light from the sample SP collected on the disk surface 36S by the imaging optical system 20 becomes an afocal luminous flux between the front group FG and the rear group RG. In addition, the relay optical system RL is configured so that the image-side focal position of the front group FG (i.e., the focal position on the CCD camera 40 side) is positioned between the front group FG and the rear group RG.

The front group FG of the relay optical system RL is constituted by a first lens group G1 that has a positive power and a second lens group G2 that has a positive power, in this order from the rotating disk 36 side. Then, a fluorescence mirror unit 32 that is a light separating unit is placed between the first lens group G1 and the second lens group G2. Accordingly, an excitation light emitted from the light source apparatus 11 is guided by the fluorescence mirror unit 32 to the rotating disk 36 through the first lens group G1.

In the microscope apparatus 100 configured as described above, a white light including an excitation light emitted from the light source unit 10 enters the disk scanning apparatus 30 and it is guided by the lens 31 to the fluorescence mirror unit 32. In the fluorescence mirror unit 32, the excitation light is selected from the white light by the excitation filter 33 and the dichroic mirror 34, and the selected excitation light is guided to the first lens group G1. The first lens group G1 collimates the excitation light and casts it on the rotating disk 36, which rotates at a high speed. The excitation light that has passed through the transmitting part 36b of the rotating disk 36 is collected on the pupil position of the objective 21 by the right-angled prism 23 and the tube lens 22, and after that, it irradiates the sample SP through the objective 21. Accordingly, Koehler illumination is realized. Meanwhile, the disk surface 36S and the sample SP are in an optically conjugate relationship. Therefore, patterns of the transmitting part 36b that change every moment along with the rotation of the rotating disk 36 are projected on the sample SP.

Fluorescence from the sample SP generated by the irradiation with the excitation light enters the imaging optical system 20. The imaging optical system 20 collects the fluorescence and forms the optical image IM1 of the sample SP on the disk surface 36S that is the image-side focal plane of the imaging optical system 20. Among the portions of the fluorescence that form the optical image IM1, the portion of the fluorescence that has been emitted outside the focal plane of the objective 21 enters the shielding part 36a of the disk surface 36S, and it is blocked out by the shielding part 36a. On the other hand, the portion of the fluorescence that has been emitted from the focal plane of the objective 21 and has passed the transmitting part 36b passes the first lens group G1 and enters the fluorescence mirror unit 32.

While the excitation light reflected on the sample SP, the lenses, and the like enters the fluorescence mirror unit 32 together with the fluorescence, the excitation light that has entered the fluorescence mirror unit 32 is blocked out by the dichroic mirror 34 and the barrier filter 35. Then, the fluorescence that has passed the fluorescence mirror unit 32 enters the second lens group G2 and it is converted and emitted as an afocal luminous flux. After that, the fluorescence as the afocal luminous flux is reflected on the mirror 37 and enters the rear group RG. The rear group RG collects the fluorescence on the CCD 41 and forms an optical image IM2. Lastly, the CCD 41 converts the incoming fluorescence into an electric signal, and the CCD camera 40 obtains a confocal fluorescence image of the sample SP.

In the microscope apparatus 100, the rotating disk 36 placed at a position that is optically conjugate with the focal plane of the objective 21 rotates at a high speed, so that the sample SP positioned on the focal plane of the objective 21 can be scanned at a high speed. Therefore, a confocal fluorescence image having a high contrast and resolution can be obtained at a high speed.

In addition, in the microscope apparatus 100, a normal fluorescence observation may be performed by exchanging the rotating disk 36 that includes the shielding part 36a with a disk without a shielding part 36a, or by removing the rotating disk 36 that includes the shielding part 36a. Therefore, the observation method can be switched between the confocal fluorescence observation and the normal fluorescence observation by a simple operation. Accordingly, the usage may be switched as follows; a normal fluorescence observation may be performed in a case in which priority is given to the brightness of the image, such as when executing a task to find an observation part or when performing visual observation using an observation optical system constituted by an eyepiece which is not illustrated in the drawings, and a confocal fluorescence observation may be performed in a case of obtaining an image.

Hereinafter, the disk scanning apparatus 30 is explained in greater detail.

Figure 3B:
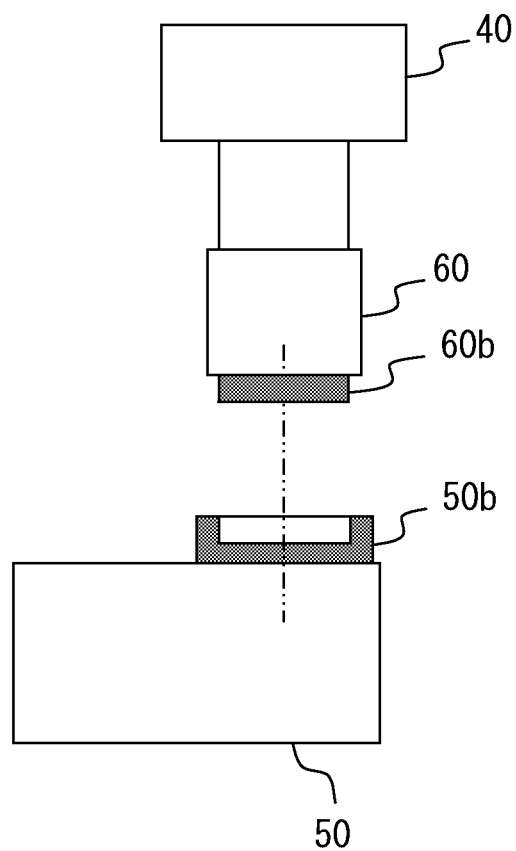
FIG. 3B is a diagram illustrating another example of a first housing and a second housing of a disk scanning apparatus according to Embodiment 1 of the present invention.

First, with reference to FIG. 3A and FIG. 3B, a description is given to explain that a space for adding optical elements may be provided easily in the disk scanning apparatus 30 according to need.

In addition to the constituent elements illustrated in FIG. 1, the disk scanning apparatus 30 includes, as illustrated in FIG. 3A, a housing 50 that is a first housing that accommodates the constituent elements illustrated in FIG. 1 inside, and a housing 60 that is a second housing configured to be mechanically combinable with and separable from the housing 50. The housing 50 accommodates at least the front group FG, and the housing 60 accommodates at least the rear group RG. The housing 50 includes a combining structure 50a that forms a pair with a combining structure 60a included in the housing 60, and accordingly, the housing 50 and the housing 60 are configured to be mechanically combinable with and separable from each other.

The pair of combining structures (combining structure 50a, combining structure 60a) are constituted by a female-shape combining structure and a male-shape combining structure, which are configured to be mateable with each other, as illustrated in FIG. 3A. Meanwhile, any shape may be adopted as the male shape and the female shape of the combining structures. For example, a combining structure 50b and a combining structure 60b illustrated in FIG. 3B may be adopted, instead of the combining structure 50a and the combining structure 60a illustrated in FIG. 3A. In addition, a screw or a magnet may be provided in the pair of combining structures, so as to support the combination of the housing 50 and the housing 60.

The distance between the front group FG accommodated inside the housing 50 and the rear group RG accommodated inside the housing 60 varies between a condition in which the housing 50 and the housing 60 are combined and a condition in which the housing 50 and the housing 60 are separated. In addition, the distance between the front group FG and the rear group RG varies even in the condition in which the housing 50 and the housing 60 are separated, depending on the degree of separation between the locations on which the housing 50 and the housing 60 are placed in the microscope apparatus 100. Accordingly, in the disk scanning apparatus 30, the housing 50 and the housing 60 configured to be mechanically combinable and separable are structures that make the distance between the front group FG and the rear group RG variable.

As described above, the disk scanning apparatus 30 includes the housing 50 and the housing 60 as structures to make the distance between the front group FG and the rear group RG variable. Therefore, a space for adding optical elements can be created easily between the front group FG and the rear group RG according to the need, by changing the distance between the front group FG and the rear group RG by means of the housing 50 and the housing 60. Accordingly, in the disk scanning apparatus 30, optical elements can be added according to need between the front group FG and the rear group RG; more specifically, between the housing 50 and the housing 60 that are mechanically separated.

According to the disk scanning apparatus 30 and the microscope apparatus 100 equipped with the disk scanning apparatus 30 configured as described above, a high versatility can be realized, since a space for adding optical elements can be provided easily according to need.

Figure 4C:
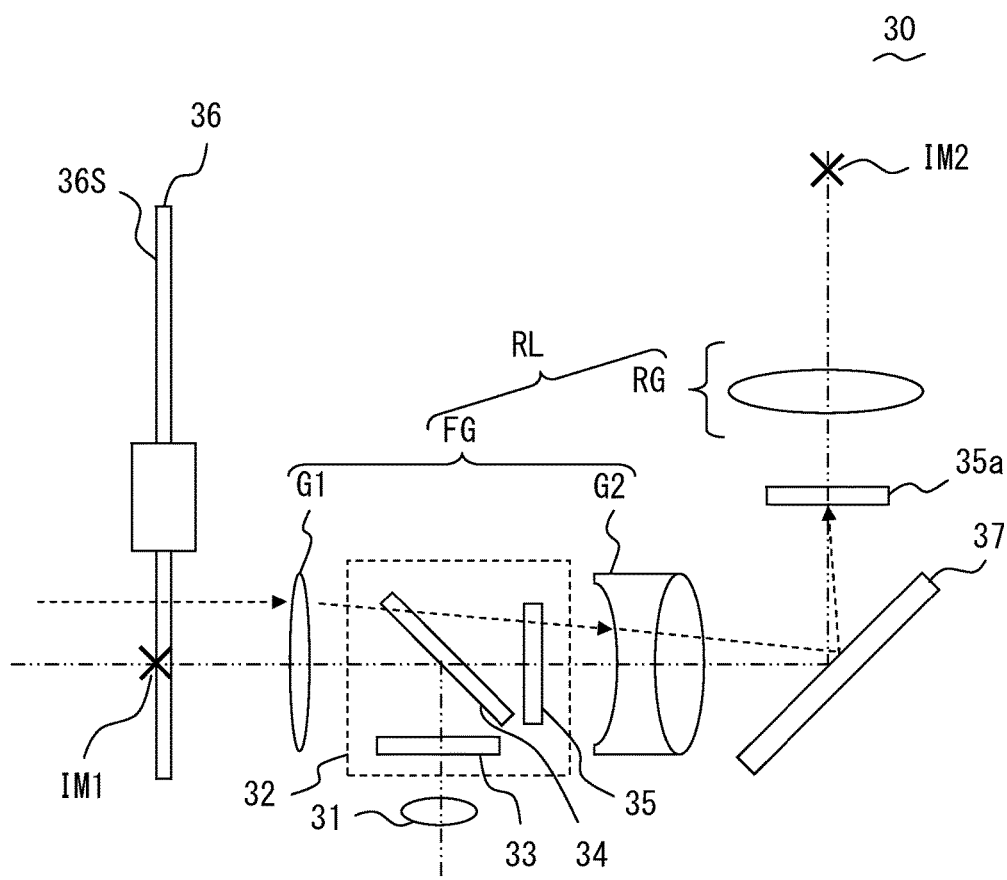
FIG. 4C is a diagram illustrating a disk scanning apparatus according to Embodiment 1 of the present invention in which a barrier filter is added in an optical path of an afocal luminous flux.

Meanwhile, any optical element may be added between the front group FG and the rear group RG, but when an optical element that has power is added between the front group FG and the rear group RG, the conjugate relationship between the disk surface 36S and the CCD 41 is not maintained. For this reason, it is preferable that the optical element added between the front group FG and the rear group RG be an optical element with no power, such as, for example, an aperture stop, an afocal variable power optical system, a barrier filter, or the like. FIG. 4A, FIG. 4B, and FIG. 4C illustrate examples in which an aperture stop 38, an afocal variable power optical system 39, and a barrier filter 35a, respectively, are inserted in the optical path of an afocal luminous flux between the front group FG and the rear group RG. The aperture stop 38, the afocal variable power optical system 39, and the barrier filter 35a illustrated in FIG. 4A through FIG. 4C are all placed on the image-side focal position of the front group FG or in its vicinity. Meanwhile, while a single optical element is added between the front group FG and the rear group RG in each of FIG. 4A through FIG. 4C, a plurality of optical elements may also be added as long as the disk scanning apparatus 30 satisfies a conditional expression (3) described later.

In the disk scanning apparatus 30 illustrated in FIG. 4A in which the aperture stop 38 is added, the entering of stray light such as autofluorescence into the CCD 41 may be prevented by reducing the aperture diameter of the aperture stop 38 according to the numerical aperture of a microscope apparatus 100 that is dependent on the objective 21 and the like. Autofluorescence that becomes noise in an image may occur in a glass material to which an excitation light has entered. Autofluorescence generated from a material (the objective 21, the tube lens 22, the right-angled prism 23) positioned on the side closer to the object (the sample SP side) with respect to the rotating disk 36 is weakened by a confocal effect when passing through the rotating disk 36. On the other hand, the confocal effect does not work on autofluorescence generated from the first lens group G1 that is positioned on the side closer to the image (the CCD camera 40 side) with respect to the rotating disk 36. This causes the image quality to be easily degraded. By adding the aperture stop 38 between the front group FG and the rear group RG, autofluorescence generated from the first lens group G1 can also be blocked out effectively. Therefore, a fluorescence image with a reduced amount of noise may be obtained according to the disk scanning apparatus 30 illustrated in FIG. 4A in which the aperture stop 38 is added.

Meanwhile, the relay optical system RL of the disk scanning apparatus 30 is configured so as not to limit the numerical aperture of the microscope apparatus. That is, the relay optical system RL is configured so as to have a high numerical aperture so as not to limit the NA of the microscope apparatus 100 at the time of the normal fluorescence observation.

In the disk scanning apparatus 30 illustrated in FIG. 4B in which the afocal variable power optical system 39 is added, the sample SP can be projected on the CCD 41 at a magnification that is different from the magnification before the addition of the afocal variable power optical system 39, without changing the projection position of the optical image IM2 of the sample SP. That is, the sample SP can be observed at a different observation magnification. The afocal variable power optical system 39 constituted by a convex lens and a concave lens in this order from the object side may be configured so as to allow the lens interval between the convex lens and the concave lens to be adjustable. In this case, an adjustment may be made so that the optical image IM2 is projected accurately on the CCD 41 by changing the lens interval between the convex lens and the concave lens, since a change in the lens interval between the convex lens and the concave lens causes a large change in the back focal position. Meanwhile, the afocal variable power optical system to be added between the front group FG and the rear group RG may be constituted by a concave lens and the convex lens in this order from the object side. In addition, the afocal variable power optical system to be added between the front group FG and the rear group RG is not limited to an afocal variable power optical system that has a fixed magnification, and may be an afocal zoom variable power optical system in which the magnification is variable. By adding an afocal zoom variable power optical system, the observation magnification may be changed without changing the optical elements.

The disk scanning apparatus 30 illustrated in FIG. 4C in which the barrier filter 35a is added is capable of blocking out an excitation light that the barrier filter 35 in the fluorescence mirror unit 32 failed to block out. Meanwhile, the image position is changed in the optical axis direction when a parallel flat plate such as the barrier filter 35a is inserted in the optical path of a convergent luminous flux or a divergent luminous flux. The barrier filter 35a is capable of blocking out an excitation light without changing the image position, since it is placed in the optical path of an afocal luminous flux.

It is preferable that the aperture stop 38 be placed on the image-side focal position of the front group FG or in its vicinity, in order to exercise its functions. On the other hand, the afocal variable power optical system 39 and the barrier filter 35a do not have to be placed on the image-side focal position of the front group FG or in its vicinity, as long as they are placed between the front group FG and the rear group RG. However, it is preferable to place these optical elements on the image-side focal position of the front group FG or in its vicinity in that the lens diameter and the filter diameter may be reduced. In addition, it is also preferable in that the brightness in the field of view not easily become uneven (non-uniform) even when the diameter of the filter is smaller than the diameter of the luminous flux. Furthermore, this is also preferable in that the variation in the exit pupil position due to the insertion and removal of the afocal variable power optical system 39 may be suppressed so as to remain small.

In the disk scanning apparatus 30, the optical elements provided detachably between the front group FG and the rear group RG (for example, the aperture stop 38, the afocal variable power optical system 39, and the barrier filter 35*a* illustrated in FIG. 4A through FIG. 4C) are accommodated in a housing 70 that is a third housing that has a pair of combining structures constituted by a combining structure 71*a* in a male shape and a combining structure 71*b* in a female shape, as illustrated in FIG. 5A. Then, the combining structure 71*a* of the housing 70 mates to the combining structure 50*a* of the housing 50, and the combining structure 71*b* of the housing 70 mates to the combining structure 60*a* of the housing 60. Accordingly, the optical elements accommodated in the housing 70 are placed detachably between the housing 50 and the housing 60.

Meanwhile, the pair of combining structures of the housing 70 may take any configuration as long as they are configured as mateable with the combining structures of the housing 50 and the housing 60, respectively. Therefore, the housing 70 may include a combining structure 72*a* and a combining structure 72*b* illustrated in FIG. 5B instead of the combining structure 71*a* and the combining structure 71*b* illustrated in FIG. 5A, depending on the shape of the combining structures of the housing 50 and the housing 60. In addition, a screw or a magnet may be provided in the pair of combining structures, so as to support the combination of the housing 70 and the housing 50 or the housing 60.

Figure 5B:
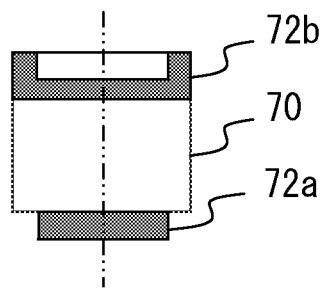
FIG. 5B is a diagram illustrating another example of a third housing of a disk scanning apparatus according to Embodiment 1 of the present invention.
Figure 6B:
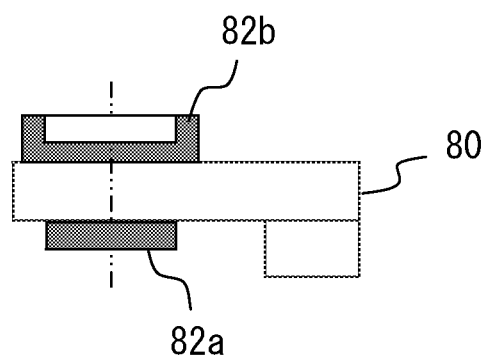
FIG. 6B is a diagram illustrating another example of a third housing that is capable of accommodating a plurality of optical elements, in a disk scanning apparatus according to Embodiment 1 of the present invention.

In addition, the optical elements provided detachably between the front group FG and the rear group RG may also be accommodated in a housing 80 that is capable of accommodating a plurality of optical elements illustrated in FIG. 6A and FIG. 6B, instead of the housing 70 illustrated in FIG. 5A and FIG. 5B. The housing 80 is similar to the housing 70 in that it is configured so that a pair of combining structures (a combining structure 81*a* and a combining structure 81*b*, and a combining structure 82*a* and a combining structure 82*b*) mate with the combining structures of the housing 50 and the housing 60. The housing 80 differs from the housing 70 in that it is configured so that the optical elements to be placed in the optical path of the afocal luminous flux may be selected from the plurality of optical elements accommodated in the housing 80 and switching to them may be performed in the mated condition. According to the housing 80, the optical elements to be placed in the optical path of the afocal luminous flux may be switched swiftly without attaching or detaching the housing 80 itself.

Next, a preferable configuration of the disk scanning apparatus 30 is explained.

In the disk scanning apparatus 30, it is preferable that the following requirements for the front group FG and the rear group RG be satisfied, in order to allow the insertion of optical elements in the optical path of the afocal luminous flux between the front group FG and the rear group RG while maintaining a good imaging performance. The requirements are that the front group FG and the rear group RG respectively have a good imaging performance assuming the distance from each to an object point as infinity, and that they be placed with the object point sides of them facing each other. This is because there are some cases wherein the relay optical system RL has a good imaging performance when the front group FG and the rear group RG do not have a good imaging performance independently and cancel the aberration of each other. Then, in such a case, the imaging performance significantly decreases due to a change in the distance between the front group FG and the rear group RG along with the insertion/removal of the optical elements, a relative shift or inclination of the optical axis of the rear group RG with respect to the optical axis of the front group FG, and the like. For this reason, it is preferable that the front group and the rear group RG be respectively constituted by a plurality of lenses including a positive lens and a negative lens, and independently have a good imaging performance.

Incidentally, when an optical filter (for example, the dichroic mirror 34, the barrier filter 35, or the like) is placed in the optical path of a convergent luminous flux or a divergent luminous flux, the image position changes depending on the thickness of the optical filter. Therefore, when there is an error in the thickness of the optical filter with respect to the design value, an image is formed at a position that is different from a prescribed image position. Accordingly, it is desired that, generally, a fluorescence mirror unit be placed in the optical path of an afocal luminous flux.

However, in the disk scanning apparatus 30, if the fluorescence mirror unit 32 is placed in the optical path of an afocal luminous flux, that is, between the front group FG and the rear group RG, the excitation light passes through the entirety of the front group FG including a plurality of lenses. As described before, the autofluorescence generated from a lens on the side closer to the image with respect to the rotating disk 36 especially tends to cause a degradation of the image quality. For this reason, this configuration in which an excitation light passes through the entirety of the front group FG including a plurality of lenses is not a preferable configuration in terms of the suppression of autofluorescence.

Meanwhile, if the fluorescence mirror unit 32 is placed between the rotating disk 36 and the front group FG in order to suppress autofluorescence, fluorescence emitted from a point (an object point or an image point) of the sample SP or the optical image IM1 enters the fluorescence mirror unit 32 as a divergent luminous flux that has a large divergence angle. Therefore, in this configuration, a slight error in the thickness of the optical filter causes a significant change in the image position.

Therefore, in the disk scanning apparatus 30, in order to satisfy contrary requirements to suppress the variation in the image position and to suppress autofluorescence in a well-balanced manner while maintaining a good imaging performance, it is preferable that the following conditions be satisfied. One of the conditions is that the front group FG be constituted by a first lens group G1 that has a positive power and includes the smallest number of lens(es) possible and a second lens group G2 that has a positive power, in this order from the object side (the rotating disk 36 side). Furthermore, it is preferable that the lenses that constitute the first lens group G1 be formed by a following material. The material is a glass material with less autofluorescence and a low-dispersion material (synthetic quartz, artificial fluorite, ED glass (Extra-low dispersion glass), or the like) that is advantageous for the correction of aberrations. Along with these, it is preferable that the fluorescence mirror unit 32 be placed between the first lens group G1 and the second lens group G2.

It is preferable that the disk scanning apparatus 30 (the relay optical system RL) be configured so that the first lens group G1 has a focal length that is close the focal length of the front group FG. More specifically, it is preferable that a conditional expression (1) below be satisfied. Furthermore, it is preferable that a conditional expression (2) be satisfied. Here, ff is the focal length of the front group FG, f1 is the focal length of the first lens group G1, h is the maximum ray height in the first lens group G1, and d1 is the distance between the first lens group G1 and the second lens group G2.

$$0.7 \leq f1/ff \leq 0.9 \quad (1)$$

$$4 \leq d1/h \leq 6 \quad (2)$$

Figure 7:
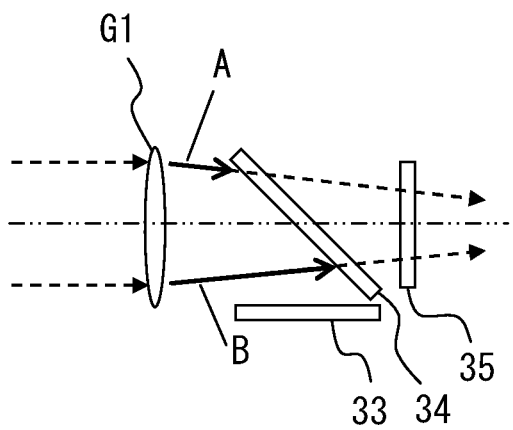
FIG. 7 is a diagram for explaining effects of a first lens group of Embodiment 1 of the present invention.

When f1/ff is smaller than the lower limit (0.7) of the conditional expression (1), the focal length of the first lens group G1 becomes too short. Accordingly, fluorescence that has entered the front group FG is refracted to a large extent in the first lens group G1, causing a significant unevenness in the brightness in the field of view. This is because, when the first lens group G1 is not provided, the principal rays from the respective points of the sample SP or the optical image IM1 (i.e., object points or image points) enter the dichroic mirror 34 that has an optical property dependent on the incident angle at the same incident angle, but when the first lens group G1 is provided, the difference in the incident angles between the principal rays entering the dichroic mirror 34 becomes larger with a larger refraction in the first lens group G1, as illustrated in FIG. 7. Meanwhile, a ray A and a ray B in FIG. 7 respectively represent the most off-axis principal rays. FIG. 7 illustrates the way in which the ray A and the ray B refracted in the first lens group G1 enter the dichroic mirror 34 placed to be inclined with respect to the optical axis.

In addition, the image-side focal position of the front group FG tends to be closer to the front group FG, when the proportion of the focal length of the first lens group G1 with respect to the focal length of the front group FG is made shorter. Then, when f1/ff is smaller than the lower limit (0.7) of the conditional expression (1), there is a high possibility that the image-side focal position of the front group FG will be positioned not between the front group FG and the rear group RG but within the front group FG. For this reason, it becomes difficult for optical elements provided detachably to be placed on the image-side focal position of the front group FG or in its vicinity. It is especially unpreferable when it is impossible to place an aperture stop on the image-side focal position of the front group FG or in its vicinity, since the aperture stop does not function appropriately then.

In addition, the longer the focal length of the front group FG is, the larger the luminous flux diameter of the afocal luminous flux emitted from the front group FG tends to be. Then, when f1/ff is smaller than the lower limit (0.7) of the conditional expression (1), the focal length of the front group FG becomes too long, and there is a high possibility that the luminous flux diameter of the afocal luminous flux will become too large. In this case, an addition of an optical element that has a diameter smaller than the luminous flux diameter of the afocal luminous flux between the front group FG and the rear group RG may cause a loss in the light volume, a limitation in the numerical aperture, and the like. This is not preferable because in order to avoid this, it becomes necessary to make the optical element large according to the large luminous flux diameter of the afocal luminous flux.

Meanwhile, when f1/ff is larger than the upper limit (0.9) of the conditional expression (1), the focal length of the first lens group G1 becomes close to the focal length of the front group FG, and takes charge of the major part of the imaging performance of the front group FG. For this reason, it becomes difficult to configure the first lens group G1 with the smallest number of lens(es) possible (for example, one).

When d1/h is smaller than the lower limit (4) of the conditional expression (2), the distance between the first lens group G1 and the second lens group G2 is too short with respect to the maximum ray height. For this reason, it is difficult to secure a sufficient space for inserting a mechanism to switch the optical filter and/or the fluorescence mirror unit 32 or the like to be placed between the first lens group G1 and the second lens group G2. Meanwhile, the conditional expression (2) is defined by the proportion of the distance between the first lens group G1 and the second lens group G2 with respect to the maximum ray height in the first lens group G1 because, in general, the higher the maximum ray height is, the greater is the necessity to make the diameter of the filter be included in the fluorescence mirror unit 32.

On the other hand, when d1/h is higher than the upper limit (6) of the conditional expression (2), the disk scanning apparatus 30 becomes unnecessarily large due to a space that is excessive as a space for inserting the fluorescence mirror unit 32 or the like, generated between the first lens group G1 and the second lens group G2.

Figure 8B:
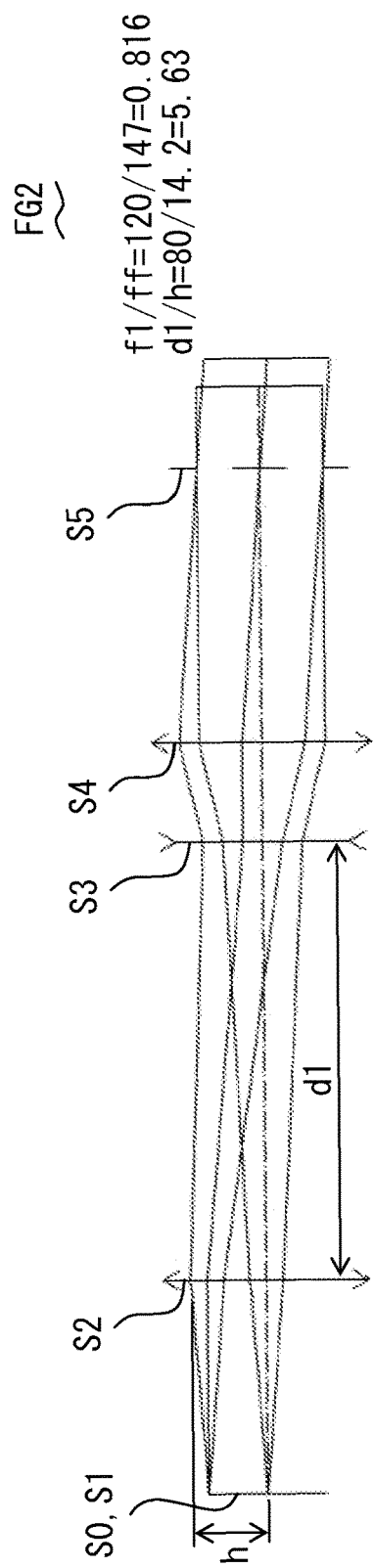
FIG. 8B is a diagram illustrating another example of a configuration of a front group constituted by ideal lenses.
Figure 8C:
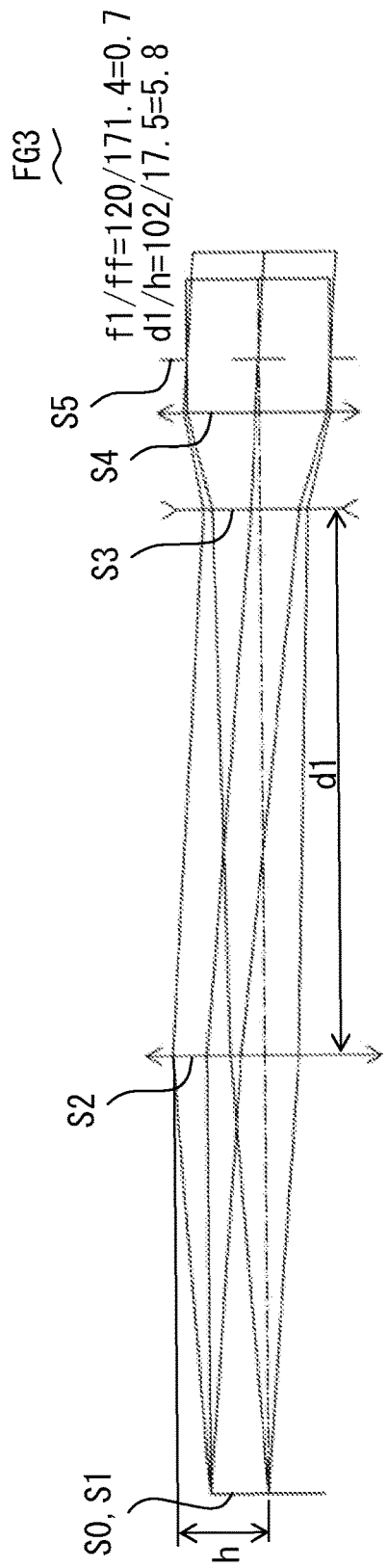
FIG. 8C is a diagram illustrating yet another example of a configuration of a front group constituted by ideal lenses.

In order to check the matters described in the conditional expressions (1) and (2), a plurality of front groups FG designed simply so as to satisfy the conditional expressions (1) and (2) are illustrated in FIG. 8A through FIG. 8C. FIG. 8A through FIG. 8C are respectively a sectional view of a front group FG that is constituted by ideal lenses without thickness and that satisfies the conditional expression (1) and the conditional expression (2). In FIG. 8A through FIG. 8C, a luminous flux from an image point on the axis of the disk surface 36S and a luminous flux from the most off-axis image point are illustrated, together with the lens configuration.

The front group FG1 illustrated in FIG. 8A, the front group FG2 illustrated in FIG. 8B, and the front group FG3 illustrated in FIG. 8C are all based on assumptions that the entrance pupil position is at infinity and that the image height of the optical image IM1 is 11 mm. Along with that, the design is made so that the numerical aperture NA of the object side of the relay optical system becomes 0.08. Meanwhile, the upper limit of the image-side numerical aperture of an imaging optical system of a general microscope is about 0.04 to 0.06, and therefore, the configuration is made so that the relay optical system RL does not limit the numerical aperture of the microscope apparatus 100. Furthermore, NA is configured to be larger than 0.06, so that even when the exit pupil position of the microscope apparatus (the entrance pupil position for the disk confocal apparatus) is different, vignetting around the field of view and degradation of the imaging performance may be suppressed to the minimum.

In addition, assuming that the range of the appropriate focal length of the front group is about 130 mm to 180 mm, a focal length within this range is given to the front groups in FIG. 8A through FIG. 8C. In order to reduce the difference in the incident angles between the principal rays entering the dichroic mirror 34, it is preferable that the focal length of the first lens group G1 be equal to or larger than 10 times the image height of the optical image IM1. In view of this, a focal length of 120 mm (10.9 times the image height 11 mm) is given to all the first lens groups of the front groups in FIG. 8A through FIG. 8C. That is, an angle tan θ of the most off-axis principal ray entering the dichroic mirror 34 with respect to the optical axis is ±0.092(=11/120).

Meanwhile, various data of the front group FG1, the front group FG2, and the front group FG3 are as follows.

| S | THI | FL |
|---|---|---|
| Front group FG1 | | |
| ff = 135.5 mm, f1 = 120 mm, h = 15.4 mm, d1 = 63 mm | | |
| 0 | 0. | |
| 1 | 53.6410 | |
| 2 | 63.0000 | 120 |
| 3 | 17.0000 | −40 |
| 4 | 75.0000 | 49 |
| 5 | INF | |
| Front group FG2 | | |
| ff = 147 mm, f1 = 120 mm, h = 14.2 mm, d1 = 80 mm | | |
| 0 | 0. | |
| 1 | 39.0000 | |
| 2 | 80.0000 | 120 |
| 3 | 18.0000 | −40 |
| 4 | 50.0000 | 49 |
| 5 | INF | |
| Front group FG3 | | |
| ff = 171.4 mm, f1 = 120 mm, h = 17.5 mm, d1 = 102 mm | | |
| 0 | 0. | |
| 1 | 81.9050 | |
| 2 | 102.0000 | 120 |
| 3 | 18.0000 | −40 |
| 4 | 10.0000 | 54 |
| 5 | INF | |

Here, S represents the surface number, THI represents the surface interval (mm), and FL represents the focal length (mm) of the ideal lens. Meanwhile, S0 represents the image plane, S1 represents the disk surface 36S, S2 represents the ideal lens that constitutes the first lens group G1, S3 and S4 represent the respective ideal lenses that constitute the second lens group G2, and S5 represents the image-side focal plane of the front group FG. THI1 represents the distance from S1 to S2, TH2 represents the distance from S2 to S3 (i.e., distance d1), and TH5 represents the distance from S5 to the image plane (infinity). FL2 represents the focal length of the ideal lens represented by S2 (the first lens group G1), and FL3 and FL4 represent the focal lengths of the respective ideal lenses represented by S3 and S4.

The front group FG1 illustrated in FIG. 8A satisfies the conditional expressions (1) and (2), as indicated in expressions (A1) and (A2) below.

$$f1/ff=120/135.5=0.89 \quad (A1)$$

$$d1/h=63/15.4=4.1 \quad (A2)$$

The front group FG2 illustrated in FIG. 8B satisfies the conditional expressions (1) and (2), as indicated in expressions (B1) and (B2) below.

$$f1/ff=120/147=0.816 \quad (B1)$$

$$d1/h=80/14.2=5.63 \quad (B2)$$

The front group FG3 illustrated in FIG. 8C satisfies the conditional expressions (1) and (2), as indicated in expressions (C1) and (C2) below.

$$f1/ff=120/171.4=0.7 \quad (C1)$$

$$d1/h=102/17.5=5.8 \quad (C2)$$

The matters explained in relation to the conditional expressions (1) and (2) may be checked by comparing and referring to FIG. 8A through FIG. 8C. For example, it is confirmed that the smaller the f1/ff is, the closer to the last lens of the front group the image-side focal plane of the front group is located. In addition, it is also confirmed that the longer the ff is, the larger the luminous flux diameter of the afocal luminous flux emitted from the front group is.

It is preferable that the disk scanning apparatus 30 (relay optical system RL) satisfy a conditional expression (3) below. Here, d2 is the distance between the image-side focal position of the front group FG and the rear group RG.

$$d2 \leq ff \times 0.8 \quad (3)$$

Figure 9A:
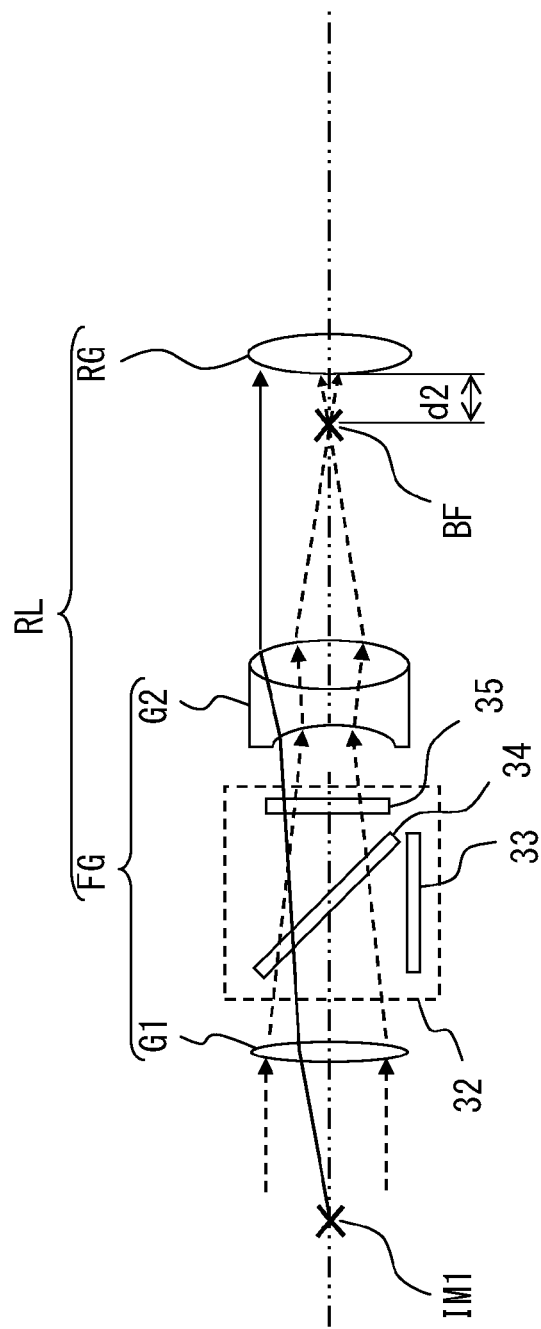
FIG. 9A is a diagram illustrating a case in which the distance from a back focal position of a front group to a rear group is relatively short in a disk scanning apparatus according to Embodiment 1 of the present invention.
Figure 9B:
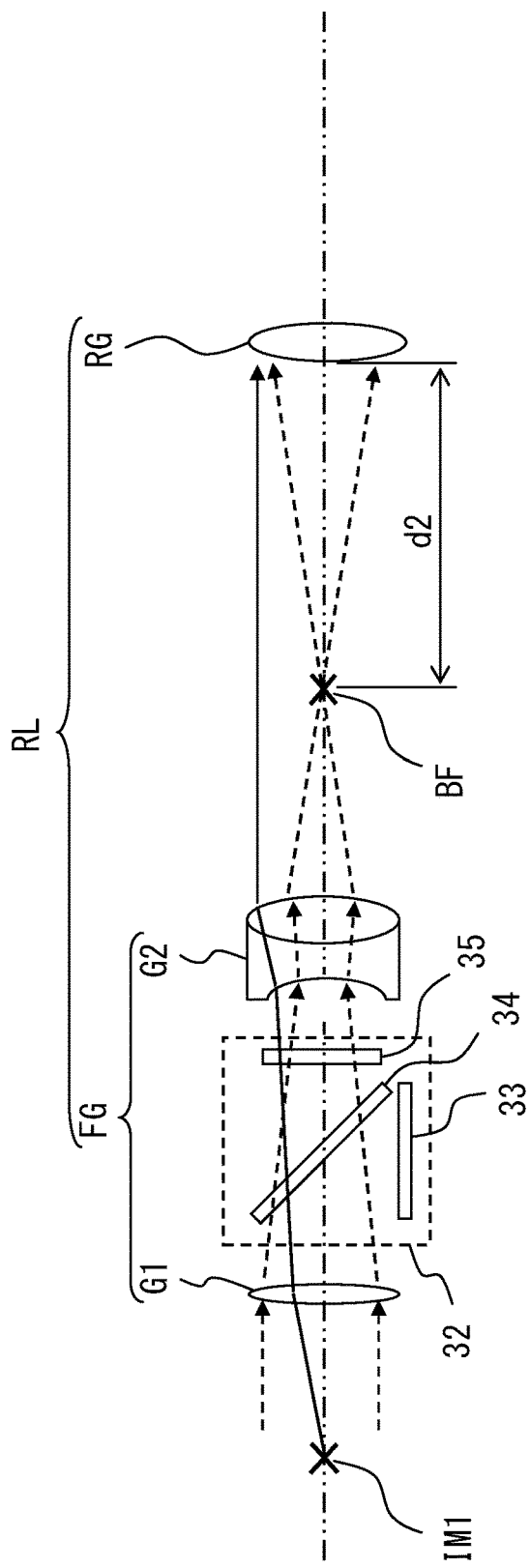
FIG. 9B is a diagram illustrating a case in which the distance from a back focal position of a front group to a rear group is relatively long in a disk scanning apparatus according to Embodiment 1 of the present invention.

As illustrated in FIG. 9A and FIG. 9B, with respect to the light (the solid line) emitted from an image point on the axis, even when the distance d2 between the image-side focal point BF of the front group FG and the rear group RG changes, the ray height at the time of entering the rear group RG does not change. On the other hand, with respect to the light (the broken line) emitted from an off-axis image point, when the distance d2 between the image-side focal point BF of the front group FG and the rear group RG changes, the ray height at the time of entering the rear group RG also changes. More specifically, when the distance d2 becomes longer, and, when the light is emitted from an off-axis image point that is farther from the axis, the ray height at the time of entering the rear group RG becomes higher. Therefore, when the distance d2 becomes excessively long, vignetting occurs to the off-axis light, leading to an insufficiency in the peripheral light quantity. In addition, if the lens diameter of the rear group RG is expanded in order to avoid this, the size of the rear group RG becomes large. Therefore, in order to obtain a good fluorescence image without insufficiency in the peripheral light quantity in the disk scanning apparatus 30 equipped with the rear group RG constituted by lenses having a general lens diameter, it is preferable to design the relay optical system RL so that the distance d2 is equal to or smaller than 80% of the focal length ff of the front group FG, as expressed in the conditional expression (3). In addition, it is preferable to add optical elements between the front group FG and the rear group RG within a range in which the distance d2 becomes equal to or smaller than 80% of the focal length ff of the front group FG.

It is preferable that the disk scanning apparatus 30 satisfy a conditional expression (4) below, when the projection magnification β of the relay optical system RL is 0.9<β<1.1. Here, fr is the focal length of the rear group FG, and d3 is the distance from the surface apex of the last lens surface of the rear group RG to the image plane (the light receiving surface of the CCD 41).

$$0.6 < d3/fr < 0.8 \quad (4)$$

The flange back of a large format camera may be secured when the ratio of the back focus with respect to the rear-side focus of the rear group FG is within a constant range indicated in the conditional expression (4) while the magnification of the relay optical system RL is approximately 1×. In addition, it is also preferable in that a space may be secured for adding a demagnification optical system between the relay optical system RL and the CCD camera 40.

Figure 10A:
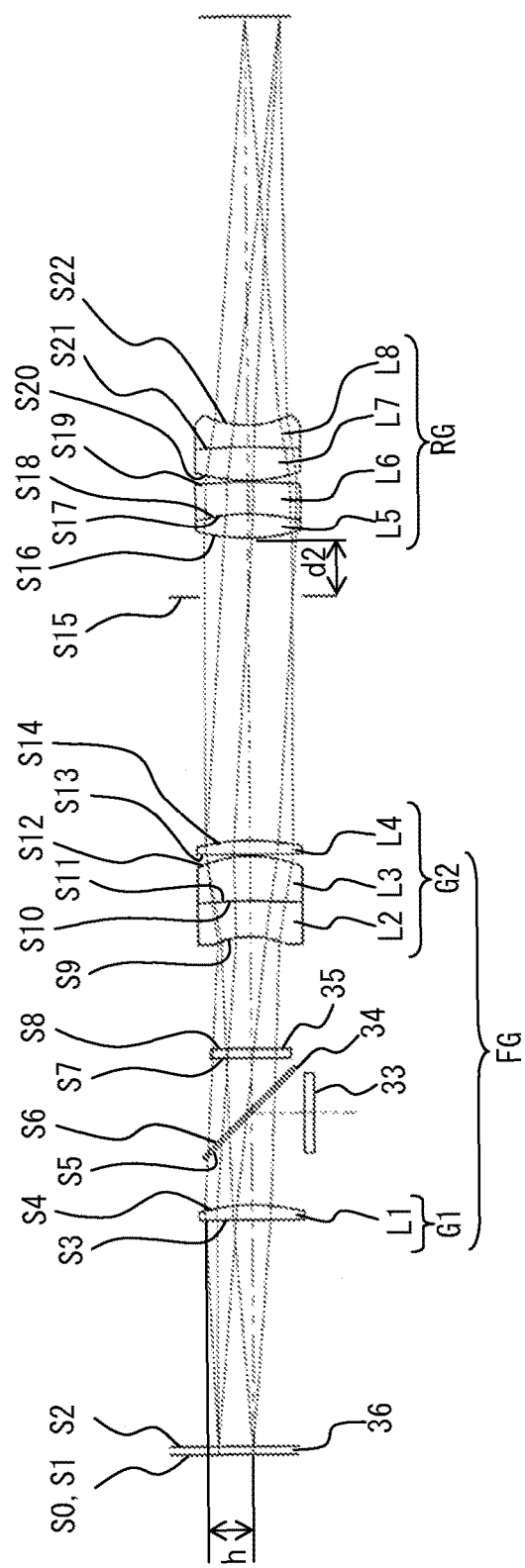
FIG. 10A is a sectional view of an optical system that does not include a deflecting mirror, in a disk scanning apparatus according to Embodiment 1.
Figure 10B:
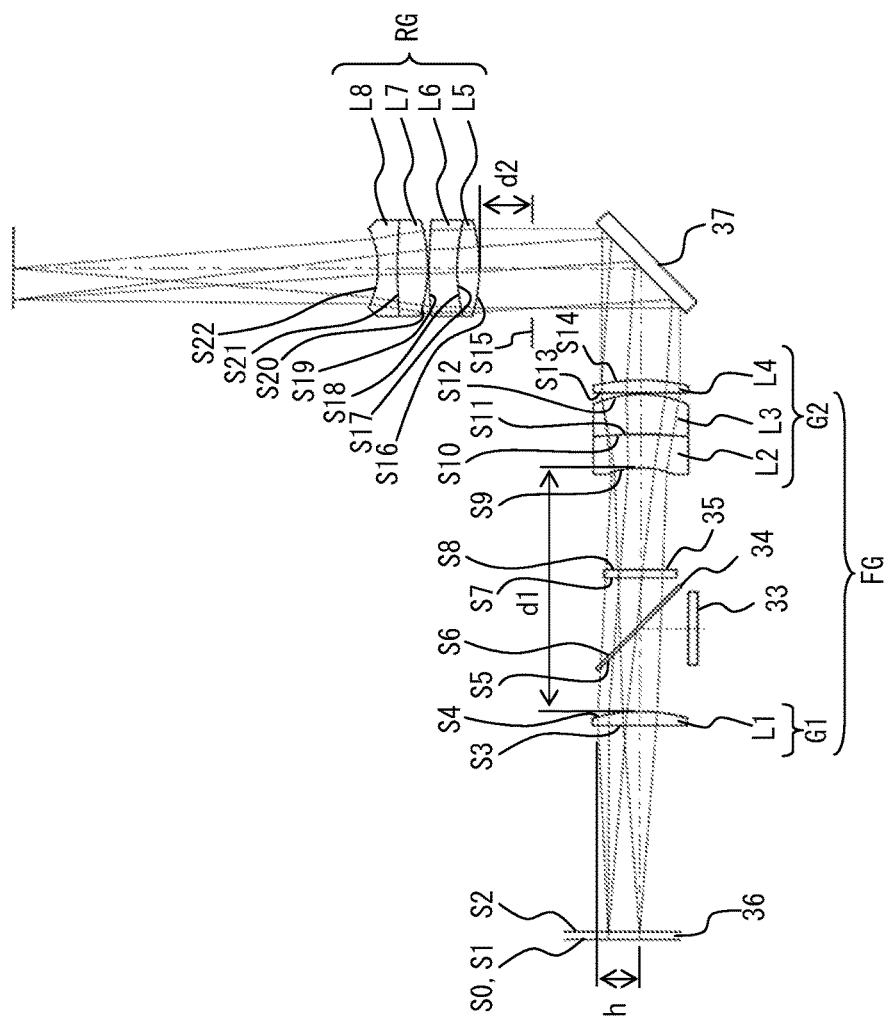
FIG. 10B is a sectional view of an optical system that includes a deflecting mirror, in a disk scanning apparatus according to Embodiment 1.
Figure 11:
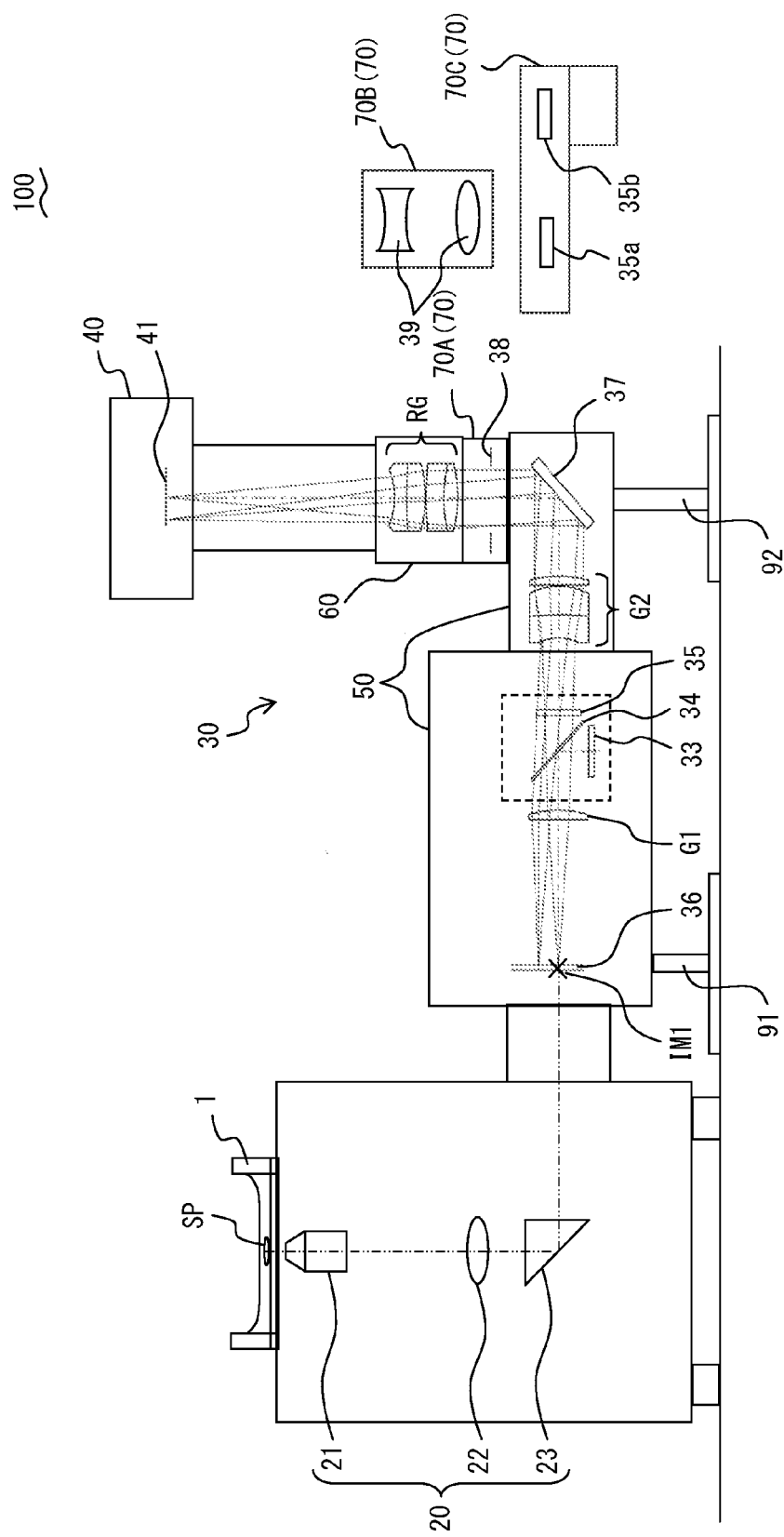
FIG. 11 is a diagram illustrating a configuration of a microscope apparatus incorporated with the disk scanning apparatus according to Embodiment 1 illustrated in FIG. 10B.

Hereinafter, a specific design example of the relay optical system RL of the disk scanning apparatus 30 according to the present embodiment is described. FIG. 10A and FIG. 10B are sectional views of the optical system of the disk scanning apparatus 30 according to the present embodiment. FIG. 11 is a diagram illustrating the configuration of the microscope apparatus 100 incorporated with the disk scanning apparatus 30 equipped with the optical system illustrated in FIG. 10B. FIG. 10A, FIG. 10B, and FIG. 11 also illustrate a luminous flux from an on-axis image point and a luminous flux from an off-axis image point. Meanwhile, FIG. 10A illustrates an example in which the mirror 37 is removed and the front group FG and the rear group RG are placed on the same straight line. FIG. 10B illustrates an example in which the front group FG and the rear group RG are placed so that the angle between the optical axis of the front group FG and the optical axis of the rear group RG is 90 degrees.

The relay optical system RL illustrated in FIG. 10A and FIG. 10B is constituted by a front group FG having a positive power and a rear group RG having a positive power, in this order from the object side (the rotating disk 36 side). The front group FG is constituted by a first lens group G1 having a positive power and a second lens group G2 having a positive power, in this order from the object side. The first lens group G1 is constituted by a plano-convex lens L1 having a positive power with its plane surface facing the object side. The second lens group G2 is constituted by a meniscus lens L2 having a negative power with its concave surface facing the object side, a meniscus lens L3 having a positive power with its concave surface facing the object side, and a plano-convex lens L4 having a positive power with its plane surface facing the object side, in this order from the object side. The rear group RG is constituted by a biconvex lens L5 having a positive power, a meniscus lens L6 having a negative power with its concave surface facing the object side, and a cemented lens constituted by a biconvex lens L7 having a positive power and a biconcave lens L8 having a negative power, in this order from the object side.

The numerical aperture NA on the object side of the relay optical system. RL, the projection magnification β of the relay optical system RL, the focal length ff of the front group FG, the focal length f1 of the first lens group G1, the maximum ray height h in the first lens group G1, the distance d1 between the first lens group G1 and the second lens group G2, and the distance d2 between the image-side focal position of the front group FG and the rear group RG are as follows.

$NA=0.08, \beta=-1, ff=156.3$ mm, $f1=130.8$ mm $h=13.4$ mm, $d1=76.7$ mm, $d2=11.5$ mm Here, the numerical aperture NA is the numerical aperture on the object side of the relay optical system RL when the outer diameter of each lens of the relay optical system RL is about φ (diameter) 30 mm and an aperture stop of about φ25 mm is placed on the back focal position of the front group FG.

The lens data of the relay optical system RL (including the dichroic mirror 34 and the barrier filter 35) illustrated in FIG. 10A and FIG. 10B are as follows.

| Relay optical system RL | | | | |
|---|---|---|---|---|
| S | RDY | THI | nd | vd |
| 0 | INF | 0 | 1 | |
| 1 | INF | 2.3 | 1.45852 | 67.83 |
| 2 | INF | 64.51 | 1 | |
| 3 | INF | 4.2 | 1.43875 | 94.93 |
| 4 | −57.408 | 26.2 | 1 | |
| 5 | INF | 1.4 | 1.51633 | 64.14 |
| 6 | INF | 14.6 | 1 | |

| Relay optical system RL | | | | |
|---|---|---|---|---|
| S | RDY | THI | nd | vd |
| 7 | INF | 2.5 | 1.51633 | 64.14 |
| 8 | INF | 32 | 1 | |
| 9 | −27.918 | 10.33 | 1.81600 | 46.62 |
| 10 | −195.737 | 0.152 | 1 | |
| 11 | −152.781 | 12.67 | 1.59522 | 67.74 |
| 12 | −36.576 | 0.5 | 1 | |
| 13 | INF | 4 | 1.43875 | 94.93 |
| 14 | −67.926 | 75 | 1 | |
| 15 | INF | 11.5 (d2) | 1 | |
| 16 | 53.508 | 7 | 1.43875 | 94.93 |
| 17 | −60.966 | 0.012 | 1 | |
| 18 | −60.570 | 9 | 1.80000 | 29.84 |
| 19 | −167.844 | 0.5 | 1 | |
| 20 | 51.395 | 9.5 | 1.80100 | 34.97 |
| 22 | −179.714 | 6.1 | 1.61340 | 44.27 |
| 23 | 28.308 | 116.519 | 1 | |

Here, S represents the surface number, RDY represents the radius of curvature (mm), THI represents the surface interval (mm), nd represents the refractive index with respect to the d line, and vd represents the Abbe number. Meanwhile, S0 represents the image plane, S1 represents the disk surface 36S, and S15 represents the back focal plane of the front group FG. THI15 represents the distance from S15 to S16, that is, the distance d2 between the back focal position of the front group FG and the rear group RG. THI22 represents the distance from S22 to the image plane on the rear side of the relay optical system RL.

The disk scanning apparatus 30 equipped with the relay optical system RL in FIG. 10A and FIG. 10B satisfies the conditional expressions (1) through (2), as indicated in expressions (D1) through (D2) below.

$$f1/ff=130.8/156.3=0.84 \quad (D1)$$

$$d1/h=76.7/13.4=5.7 \quad (D2)$$

In addition, the relay optical system RL in FIG. 10A and FIG. 10B satisfies the conditional expression (3), since the distance d2 is 11.5 mm (≤156.3×0.8). Meanwhile, it is assumed that the maximum image height of the optical image IM1 is 10 mm. At this time, when the distance d2 is expanded to 125 mm (≈156.3×0.8), the relay optical system RL realizes a value of 85% with which the influence of peripheral darkening is not noticeable as the numerical ratio at an image height of 5.5, and it realizes 50% as a numerical ratio even at an image height of 10.

When the disk scanning apparatus 30 is attached to aside of the imaging optical system 20, it is preferable that the mirror 37 be accommodated between the front group FG and the back focal position of the front group FG in an afocal optical path in the housing 50 that accommodates the front group FG, as illustrated in FIG. 10B. Accordingly, as illustrated in FIG. 11, it becomes possible to stack a housing 70 (a housing 70A, a housing 70B, a housing 70C) that accommodate optical elements and a housing 60 that accommodates the rear group RG, on the housing 50 that accommodates the front group FG, allowing the microscope apparatus 100 to be configured in a compact manner. In addition, it allows optical elements inserted between the housing 50 and the housing 60 to be placed on the back focal position or in its vicinity.

In this configuration, it is preferable that at least one support which supports the housing 50 (a support 91, a support 92) be provided near immediately below the mirror 37. This makes it possible to suppress the flection of the optical axis of the afocal luminous flux caused by the weight of the housing 70 and the optical elements accommodated in the housing 70, and thereby, the degradation of the imaging performance caused by the flection of the optical path may be reduced.

Embodiment 2

Figure 12:
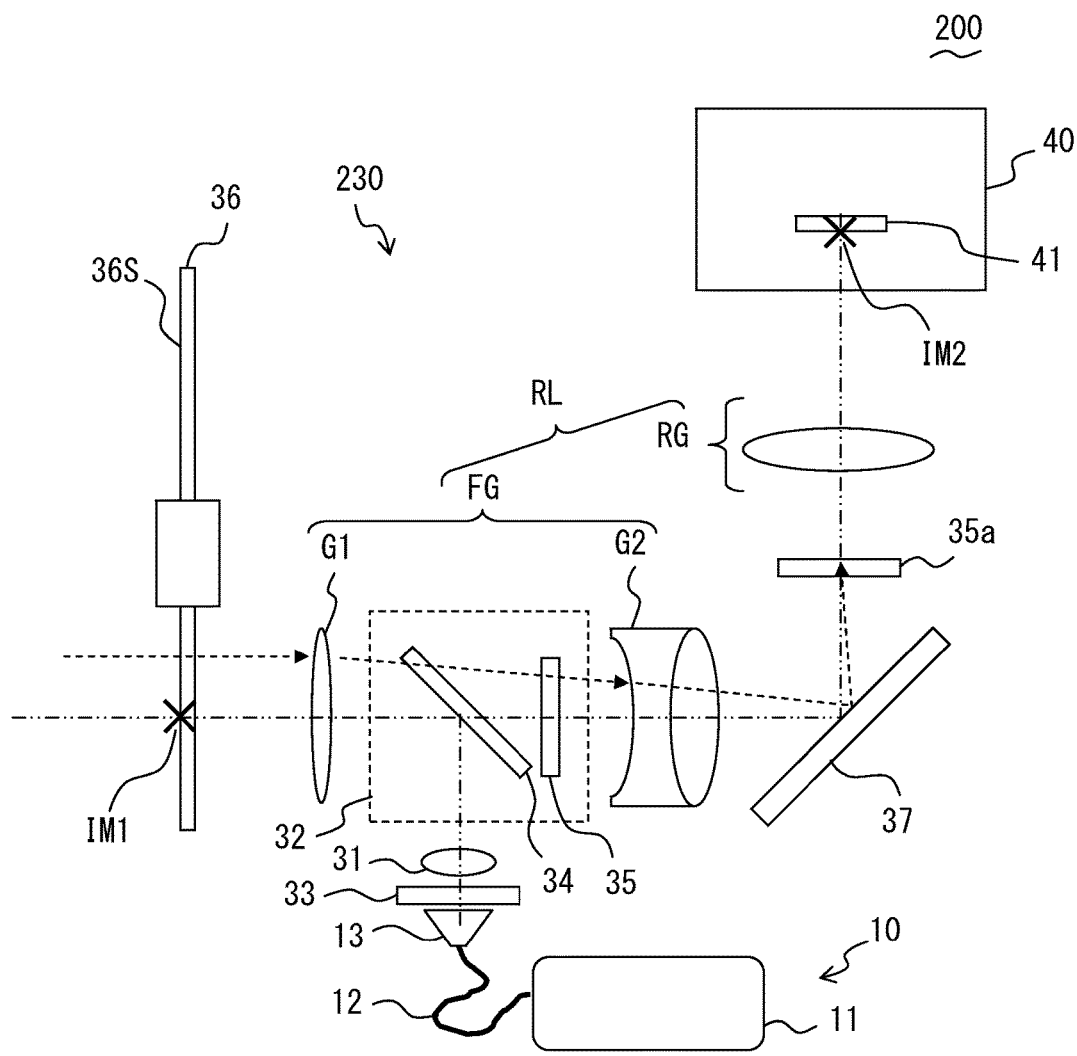
FIG. 12 is a conceptual diagram illustrating a configuration of a microscope apparatus according to Embodiment 2 of the present invention.

FIG. 12 is a conceptual diagram illustrating a configuration of a microscope apparatus 200 according to the present embodiment. The microscope apparatus 200 illustrated in FIG. 12 differs from the microscope apparatus 100 according to Embodiment 1 in including a disk scanning apparatus 230 instead of the disk scanning apparatus 30. Meanwhile, the illustration of the imaging optical system 20 is omitted in FIG. 12.

The disk scanning apparatus 230 differs from the disk scanning apparatus 30 according to Embodiment 1 in that the excitation filter 33 is placed not in the fluorescence mirror unit 32 but between the lens 31 and the connecting unit 13 of the source unit 10. The other configurations are similar to those of the disk scanning apparatus 30. Meanwhile, FIG. 12 illustrates an example in which the barrier filter 35a is inserted between the front group FG and the rear group RG.

According to the disk scanning apparatus 230 and the microscope apparatus 200 configured as described above, a space for adding optical elements can be provided easily according to the need, in a similar manner to the manner in the disk scanning apparatus 30 and the microscope apparatus 100 according to Embodiment 1. Therefore, a high versatility can be realized. In addition, in the disk scanning apparatus 230 and the microscope apparatus 200, the excitation filter 33 is placed outside the fluorescence mirror unit 32. For this reason, when changing the excitation filter 33 according to the excitation wavelength, it is possible to only change the excitation filter, without changing the entirety of the fluorescence mirror unit 32. Therefore, the excitation filter 33 may be changed at a higher speed compared with the case of changing the entirety of the fluorescence mirror unit 32.

Meanwhile, it is preferable that the exchange of the excitation filter 33 be performed together with the change of the barrier filter 35a.

Embodiment 3

Figure 13:
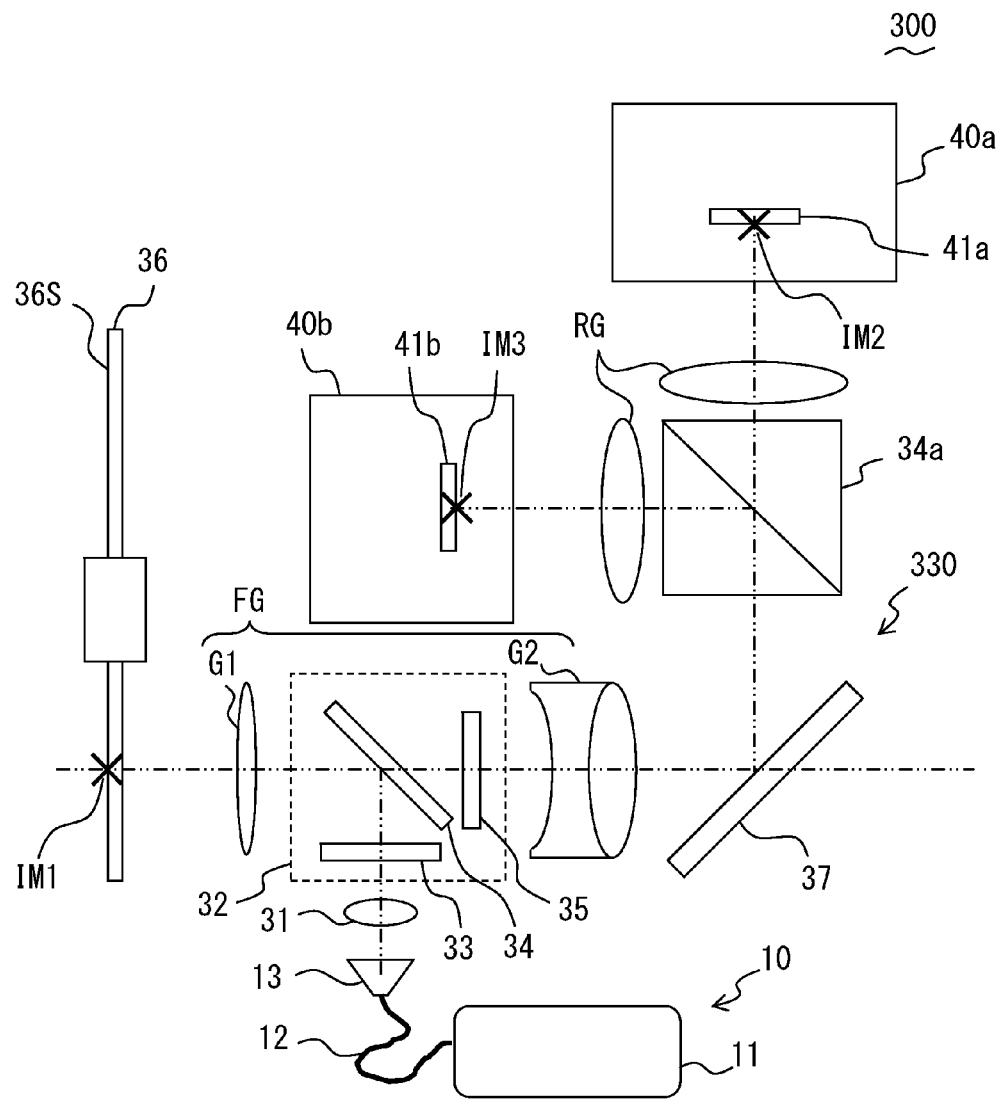
FIG. 13 is a conceptual diagram illustrating a configuration of a microscope apparatus according to Embodiment 3 of the present invention.

FIG. 13 is a conceptual diagram illustrating the configuration of a microscope apparatus 300 according to the present embodiment. The microscope apparatus 300 illustrated in FIG. 13 differs from the microscope apparatus 100 illustrated in Embodiment 1 in including a disk scanning apparatus 330 instead of the disk scanning apparatus 30, and in including two CCD cameras (a CCD camera 40a, a CCD camera 40b). Meanwhile, the illustration of the imaging optical system 20 is omitted in FIG. 13.

The disk scanning apparatus 330 differs from the disk scanning apparatus 30 according to Embodiment 1 in including a dichroic prism 34a that is an optical path branching unit to make the optical path of fluorescence branch between the mirror 37 and the rear group RG, and in including the rear group RG on each of the optical paths branched by the dichroic prism 34a. The other configurations are similar to those of the disk scanning apparatus 30.

According to the disk scanning apparatus 330 and the microscope apparatus 300 configured as described above, a space for adding optical elements can be provided easily according to the need, in a similar manner to the manner in the disk scanning apparatus 30 and the microscope apparatus 100 according to Embodiment 1. Therefore, a high versatility can be realized. In addition, in the microscope apparatus 300, portions of fluorescence having different wavelengths can be detected separately by a plurality of imaging elements (the CCD 41a and the CCD 41b). Therefore, by exciting a plurality of fluorescent materials simultaneously, a plurality of portions of fluorescence having different wavelengths can be detected simultaneously, and a plurality of fluorescence images can be obtained simultaneously.

Meanwhile, FIG. 13 illustrates an example in which the dichroic prism 34a that is an optical path branching unit is placed between the mirror 37 and the rear group RG, but the optical path branching unit may also be placed on the side closer to the image with respect to the rear group RG for example, as long as it is placed on the side closer to the image with respect to the front group FG.

Embodiment 4

FIG. 14 is a conceptual diagram illustrating a configuration of the microscope apparatus 400 according to the present embodiment. The microscope apparatus 400 illustrated in FIG. 14 differs from the microscope apparatus 100 according to Embodiment 1 in including a disk scanning apparatus 430 instead of the disk scanning apparatus 30, and in including an eyepiece 42 in addition to the CCD camera 40. Meanwhile, the illustration of the imaging optical system 20 is omitted in FIG. 14.

The disk scanning apparatus 430 differs from the disk scanning apparatus 30 according to Embodiment 1 in including the mirror 37a that is an optical path switching unit to switch the optical path of fluorescence detachably with respect to the optical path, on aside closer to the CCD camera 40 with respect to the rear group RG. The other configurations are similar to those of the disk scanning apparatus 30.

According to the disk scanning apparatus 430 and the microscope apparatus 400 configured as described above, a space for adding optical elements can be provided easily according to the need, in a similar manner to the manner in the disk scanning apparatus 30 and the microscope apparatus 100 according to Embodiment 1. Therefore, a high versatility can be realized. In addition, with the microscope apparatus 400, switching between the image capturing by the CCD camera 40 and the visual observation by the eyepiece 42 is available by the insertion and removal of the mirror 37a.

Meanwhile, FIG. 14 illustrates an example in which the mirror 37a that is an optical path switching unit is placed between the rear group RG and the CCD camera 40, but the optical path switching unit may be placed in any way as long as it is placed on the side closer to the image with respect to the front group FG.

The respective embodiments described above are specific embodiments given to facilitate understanding of the invention, and the present invention is not limited to these embodiments. The disk scanning apparatus and the microscope apparatus may be modified and changed in various ways without departing from the spirit of the present invention defined by the claims.

For example, while an inverted microscope apparatus is illustrated in the embodiments described above, the microscope apparatus may also be an upright microscope apparatus.

In addition, the disk scanning apparatus may be configured so that an optical system having a power may be added between the rear group RG and the CCD camera 40 for changing the magnification. In addition, it may also be configured so that the rear group RG may be exchanged with a lens group that has a different focal length. In this case, the distance between the housing 60 and the CCD camera 40 may be adjusted so that the optical image IM2 is formed on the CCD 41, by a mechanism for making the distance between the housing 60 that accommodates the rear group RG and the CCD camera 40 variable.

In addition, the combination between the housing 50 that accommodates the front group FG and the housing 60 that accommodates the rear group RG of the disk scanning apparatus is not limited to the combination by mateability, as long as the housing 50 and the housing 60 have combining structures with which the optical axis of the front group FG and the optical axis of the rear group RG are not easily misaligned. For example, the structures may be made so that the combining structure of one of the housings holds the combining structure of the other housing.

In addition, the structure of the disk scanning apparatus is not limited to a plurality of housings configured to be mechanically combinable and separable, as long as a structure to make the distance between the front group FG and the rear group RG variable is provided. For example, the housing may be a single housing that has an extendable total length.

In addition, while the disk scanning apparatus includes the dichroic mirror 34 that reflects an excitation light and transmits fluorescence as a light separating unit, the light separating unit may reflect either one of an excitation light emitted from the light source apparatus 11 and fluorescence from the sample S and may transmit the other. The disk scanning apparatus 30 may include a dichroic mirror that transmits an excitation light and reflects fluorescence for example, and in this case, the rotating disk 36 may be provided on the optical path of the excitation light transmitted through the dichroic mirror.

In addition, while the CCD camera is given as an example of the imaging apparatus, it may also be a CMOS camera, an EM-CCD camera, or the like.

What is claimed is:

1. A disk scanning apparatus used in combination with an imaging optical system that collects fluorescence emitted from a sample and forms an optical image of the sample and with an imaging apparatus that captures an image of the sample, comprising:
    a rotating disk including a shielding part that blocks off light and a transmitting part that transmits light on a disk surface, with the disk surface placed so as to be positioned on a focal plane of the imaging optical system in which the optical image of the sample is formed, and configured to rotate on an axis orthogonal to the disk surface;
    a relay optical system which relays the optical image of the sample formed on the disk surface to the imaging apparatus combined with the disk scanning apparatus, the relay optical system including a front group having a positive power and a rear group having a positive power, in this order from the rotating disk side, the front group and the rear group being positioned between the rotating disk and the imaging apparatus, and the relay optical system forming an afocal luminous flux between the front group and the rear group;
    a first housing which accommodates the front group; and
    a second housing which accommodates the rear group,
    wherein the second housing is mechanically combinable with and separable from the first housing such that a distance between the front group and the rear group is variable.

2. The disk scanning apparatus according to claim 1, further comprising:
    a light separating device which reflects one of an excitation light emitted from a light source apparatus used in combination with the disk scanning apparatus and the fluorescence and which transmits the other of the excitation light emitted from the light source apparatus and the fluorescence,
    wherein:
    an image-side focal position of the front group is positioned between the front group and the rear group of the relay optical system;
    the front group includes a first lens group having a positive power and a second lens group having a positive power, in this order from the rotating disk side; and
    the light separating device is placed between the first lens group and the second lens group so as to guide the excitation light emitted from the light source apparatus to the rotating disk through the first lens group.

3. The disk scanning apparatus according claim 2, wherein, assuming a focal length of the front group as ff, a focal length of the first lens group as f1, a maximum ray height in the first lens group as h, and a distance between the first lens group and the second lens group as d1, conditional expressions below are satisfied:

$$0.7 \leq f1/ff \leq 0.9$$

$$4 \leq d1/h \leq 6.$$

4. The disk scanning apparatus according claim 2, further comprising:
    an optical element which is detachable between the first housing and the second housing and which has no power,
    wherein, assuming a distance between an image-side focal position of the front group and the rear group as d2, a conditional expression below is satisfied:

$$d2 \leq ff \times 0.8.$$

5. The disk scanning apparatus according to claim 4, wherein the optical element is an afocal variable power optical system.

6. The disk scanning apparatus according to claim 4, wherein the optical element comprises an aperture stop placed on the image-side focal position of the front group or in a vicinity thereof.

7. The disk scanning apparatus according to claim 1, further comprising:
    an optical path switching device which switches an optical path of the fluorescence or an optical path branching device which makes the optical path of the fluorescence branch, the optical path switching device or the optical path branching device being arranged on a side closer to the imaging apparatus combined with the disk scanning apparatus with respect to the front group.

8. The disk scanning apparatus according to claim 7, further comprising:
    an observation optical system for observing an optical image of the sample on at least one of a plurality of optical paths switched by the optical path switching device or on at least one of a plurality of optical paths branched by the light path branching device, wherein the optical path switching device or the optical path branching device is placed on a side closer to the imaging apparatus combined with the disk scanning apparatus with respect to the front group.

9. A microscope apparatus comprising:
the disk scanning apparatus according to claim 1;
an imaging optical system used in combination with the disk scanning apparatus;
an imaging apparatus used in combination with the disk scanning apparatus; and
a light source apparatus used in combination with the disk scanning apparatus.

* * * * *